(12) United States Patent  (10) Patent No.: US 9,007,703 B2
Mouri et al.  (45) Date of Patent: Apr. 14, 2015

(54) IMAGING LENS, OPTICAL APPARATUS EQUIPPED THEREWITH, AND METHOD FOR MANUFACTURING IMAGING LENS

(75) Inventors: Motohisa Mouri, Kawasaki (JP); Issei Tanaka, Yokohama (JP)

(73) Assignee: Nikon Corporation, Tokyo (JP)

( * ) Notice: Subject to any disclaimer, the term of this patent is extended or adjusted under 35 U.S.C. 154(b) by 1011 days.

(21) Appl. No.: 13/008,975

(22) Filed: Jan. 19, 2011

(65) Prior Publication Data

US 2011/0176215 A1 Jul. 21, 2011

(30) Foreign Application Priority Data

Jan. 20, 2010 (JP) ................................ 2010-009580
Dec. 7, 2010 (JP) ................................ 2010-272975

(51) Int. Cl.
*G02B 9/12* (2006.01)
*G02B 13/02* (2006.01)

(52) U.S. Cl.
CPC ................ *G02B 13/02* (2013.01); *G02B 1/113* (2013.01)

(58) Field of Classification Search
USPC .......................... 359/676, 680–682, 686, 689
See application file for complete search history.

(56) References Cited

U.S. PATENT DOCUMENTS

| | | | |
|---|---|---|---|
| 7,715,118 B2 | 5/2010 | Kato | |
| 2008/0088944 A1* | 4/2008 | Watanabe | ..................... 359/687 |
| 2008/0247058 A1 | 10/2008 | Kato | |

FOREIGN PATENT DOCUMENTS

| | | | |
|---|---|---|---|
| JP | 02-010307 | A | 1/1990 |
| JP | 2000-356704 | A | 12/2000 |
| JP | 2000-356704 | A | 12/2000 |
| JP | 2007-086308 | A | 4/2007 |
| JP | 2007-086308 | A | 4/2007 |
| JP | 2008-257088 | A | 10/2008 |
| JP | 2009-063715 | A | 3/2009 |
| JP | 2009-063715 | A | 3/2009 |

* cited by examiner

*Primary Examiner* — James Greece
(74) *Attorney, Agent, or Firm* — Miles & Stockbridge P.C.

(57) ABSTRACT

An imaging lens SL comprising, in order from an object side: a first group G1 having positive refractive power; an aperture stop S; a second group G2 having positive refractive power; and a third group G3 having negative refractive power; upon focusing from infinity to a close object, the first group and the second group moving independently along an optical axis toward the object side, the first group including, in order from the object side, a front group having negative refractive power, and a rear group having positive refractive power, and the front group consisting of, in order from the object side, a positive lens and a negative lens, thereby providing an imaging lens capable of obtaining excellent optical performance upon focusing from infinity to a close object, with downsizing the optical system with a simple lens construction, an optical apparatus and a method for manufacturing the imaging lens.

29 Claims, 19 Drawing Sheets

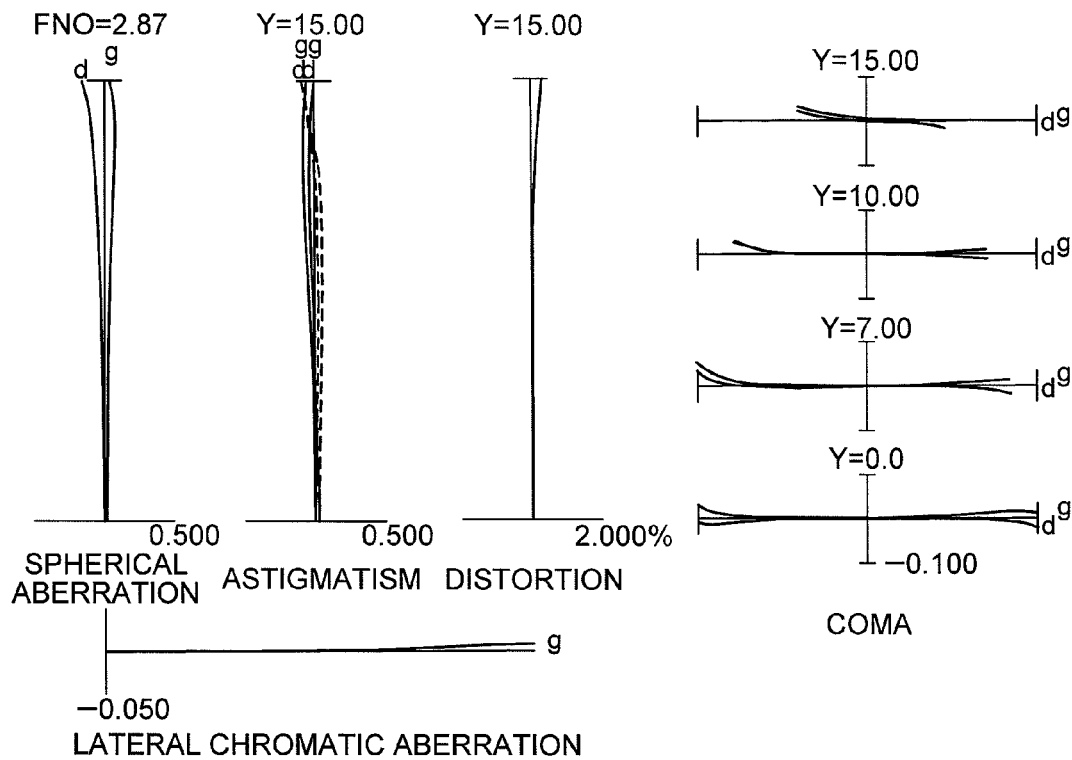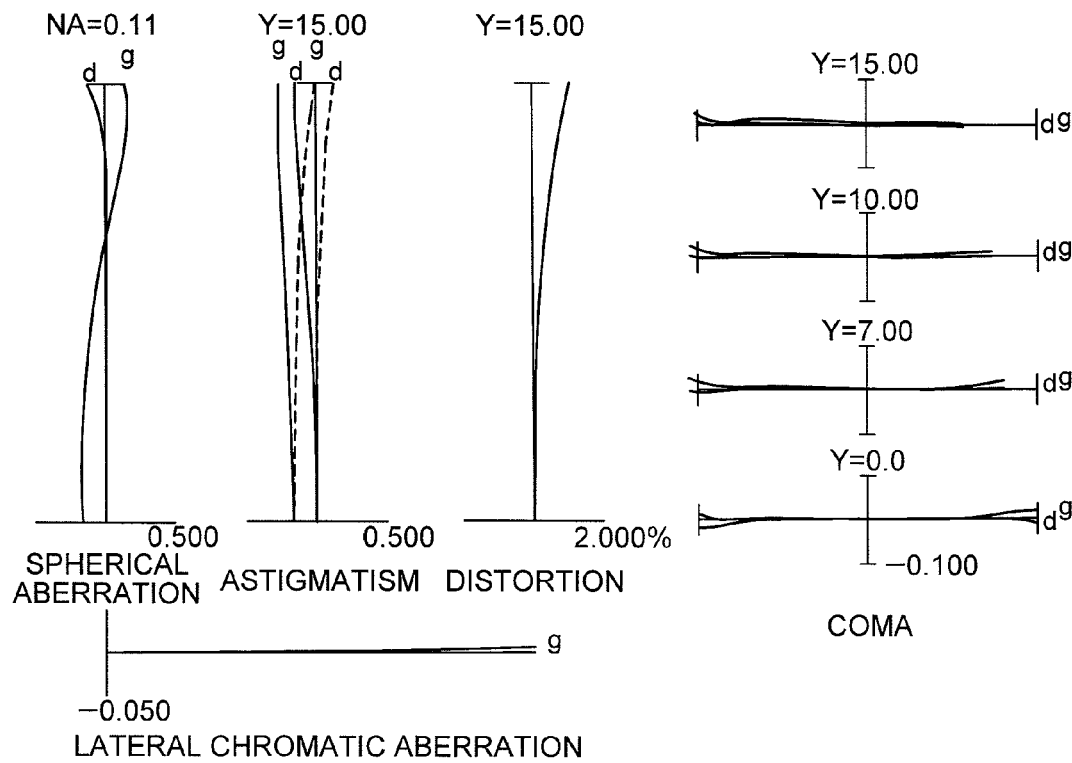

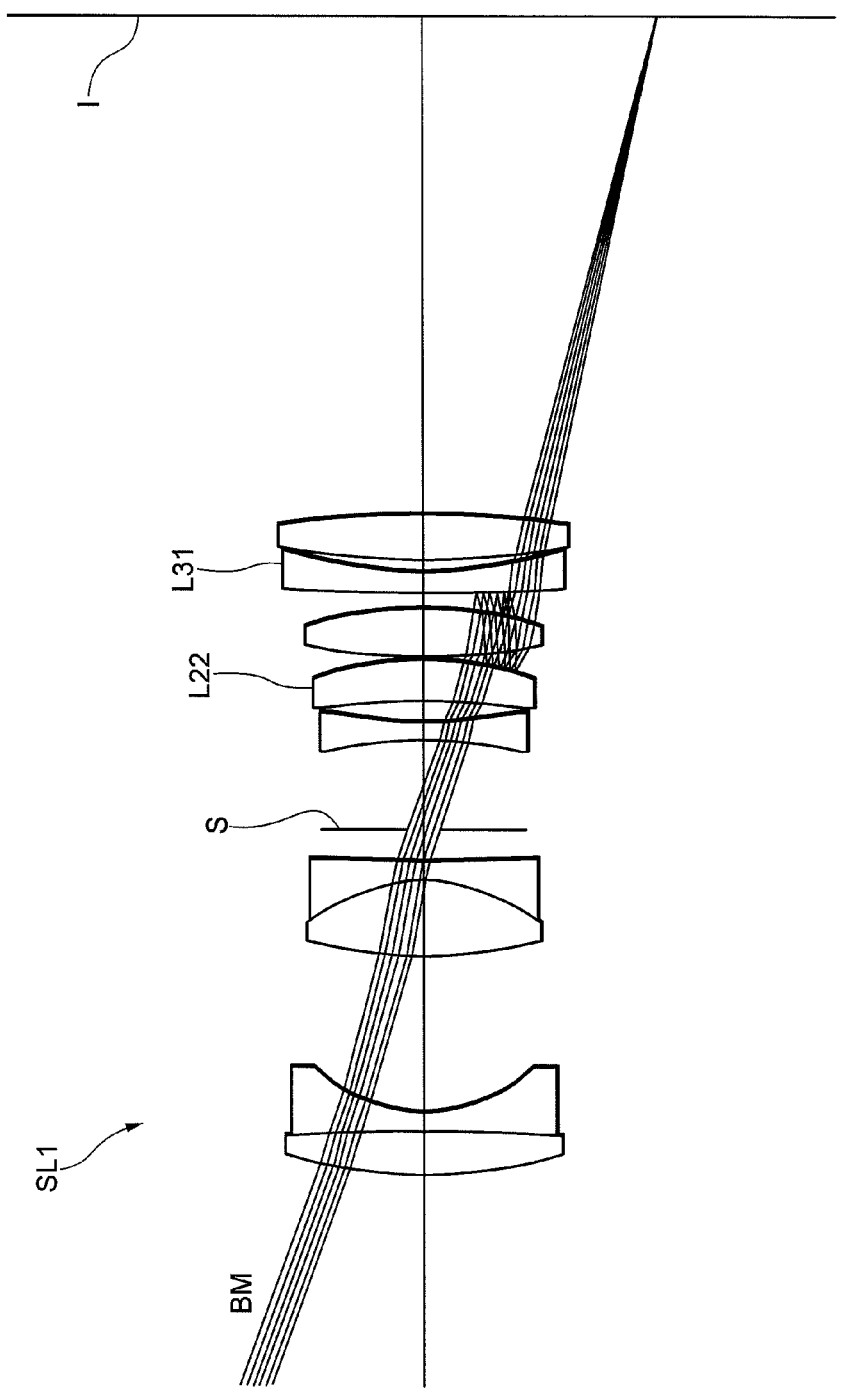

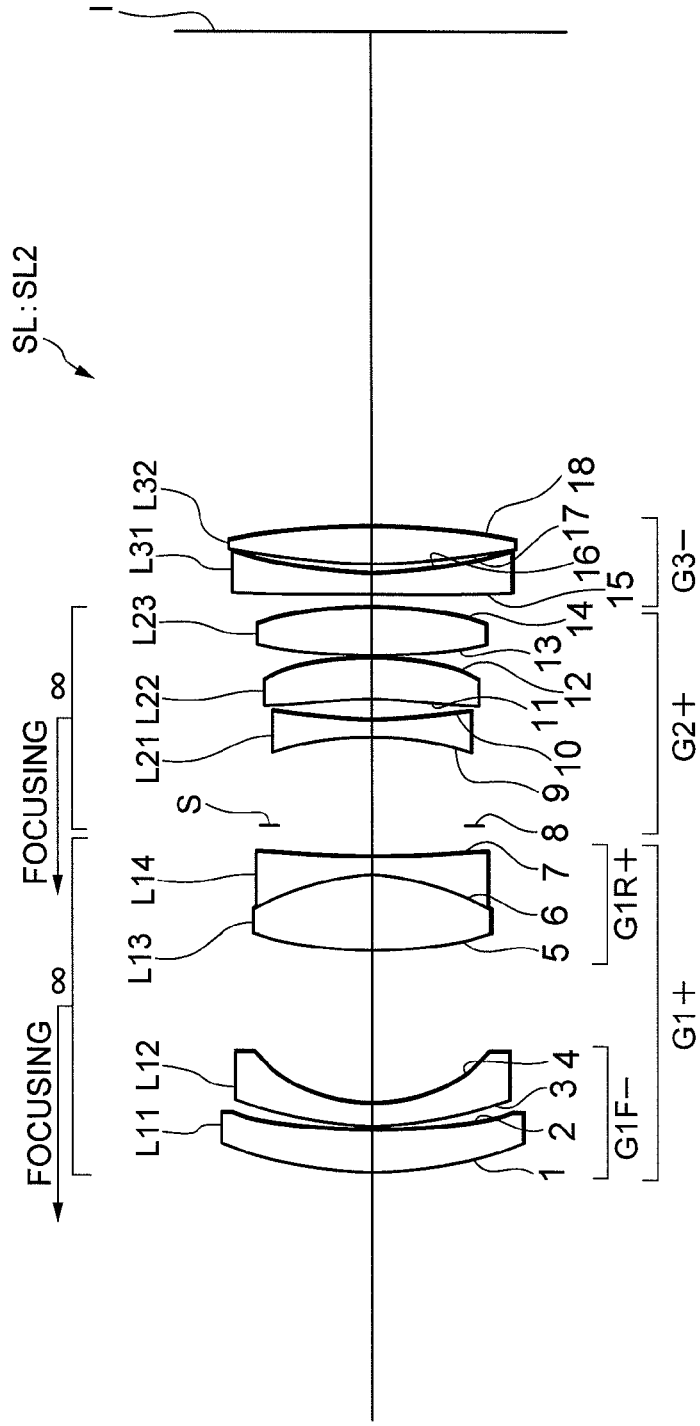

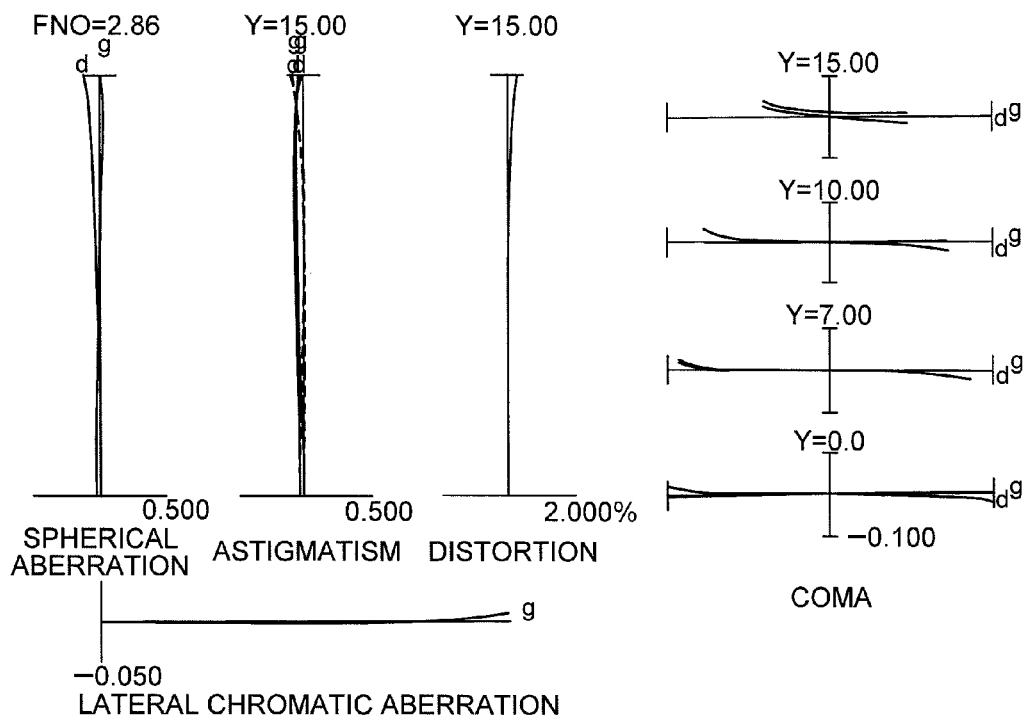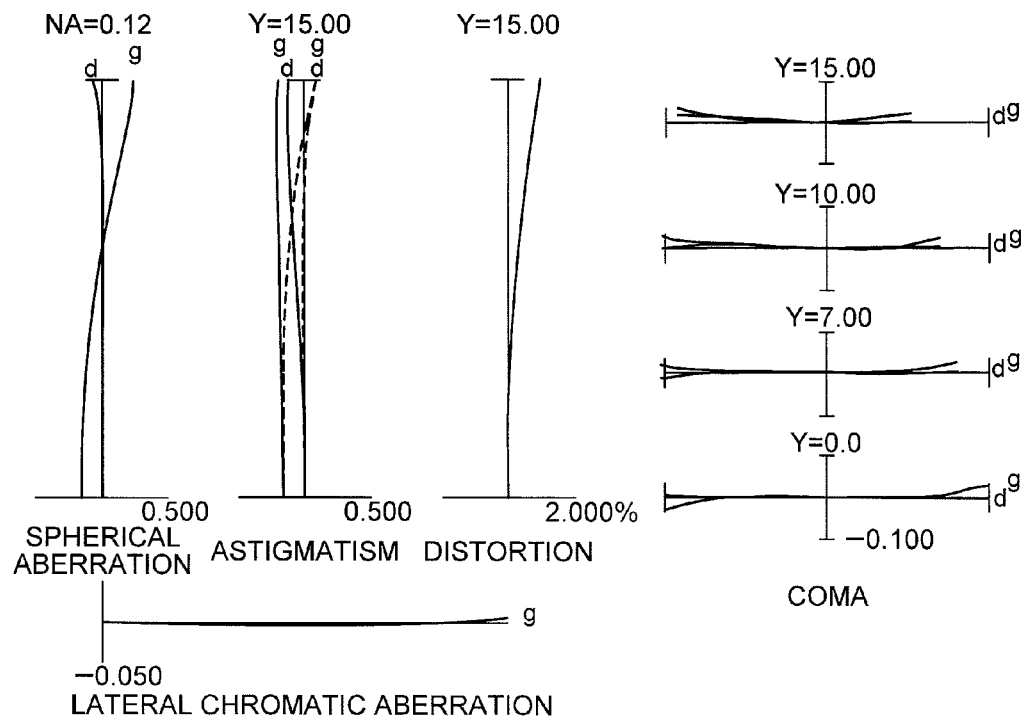

IMAGING LENS, OPTICAL APPARATUS EQUIPPED THEREWITH, AND METHOD FOR MANUFACTURING IMAGING LENS

The disclosure of the following priority applications are herein incorporated by reference:

Japanese Patent Application No. 2010-009580 filed on Jan. 20, 2010, and

Japanese Patent Application No. 2010-272975 filed on Dec. 7, 2010.

BACKGROUND OF THE INVENTION

1. Field of the Invention

The present invention relates to an imaging lens, an optical apparatus equipped with the imaging lens, and a method for manufacturing the imaging lens.

2. Related Background Art

In an optical system capable of carrying out excellent optical performance from infinity to a close object, there have been proposed various lens types such as, for example, a four-lens-group configuration disclosed in, for example, Japanese Patent Application Laid-Open No. 2009-063715, and a two-lens-group configuration disclosed in, for example, Japanese Patent Application Laid-Open No. 2007-086308. Regarding such an optical system capable of realizing excellent optical performance upon focusing from an infinity object to a close object, request for suppressing ghost images and flare, which deteriorate optical performance, as well as aberrations become increasingly strong. Accordingly, a higher optical performance is required to an antireflection coating applied to a lens surface, so that in order to meet such request, multilayer design technology and multilayer coating technology are continuously progressing (for example, see Japanese Patent Application Laid-Open No. 2000-356704).

However, in the four-lens-group configuration, because of the large number of the lens group the optical system tends to become large. Moreover, in the two-lens-group configuration, although the optical system can easily be downsized, a moving amount necessary for focusing becomes large. At the same time, there has been a problem that reflection light producing ghost images and flare tends to be generated from optical surfaces of such an imaging lens.

SUMMARY OF THE INVENTION

The present invention is made in view of the above-described problems and has an object to provide an imaging lens capable of obtaining excellent optical performance from infinity to a close object with downsizing the optical system with reducing ghost images and flare.

According to a first aspect of the present invention, there is provided an imaging lens comprising, in order from an object side: a first lens group having positive refractive power; an aperture stop; a second lens group having positive refractive power; and a third lens group having negative refractive power; upon focusing from infinity to a close object, the first lens group and the second lens group moving independently along an optical axis toward the object side, the first lens group including, in order from the object side, a front group having negative refractive power, and a rear group having positive refractive power, and the front group consisting of, in order from the object side, a positive lens and a negative lens.

In the first aspect of the present invention, it is preferable that an antireflection coating is applied on at least one optical surface among the first lens group through the third lens group, and the antireflection coating includes at least one layer formed by a wet process.

According to a second aspect of the present invention, there is provided an optical apparatus equipped with the first aspect.

According to a third aspect of the present invention, there is provided a method for manufacturing an imaging lens including, in order from an object side, a first lens group having positive refractive power, an aperture stop, a second lens group having positive refractive power and a third lens group having negative refractive power, the method comprising steps of: disposing the first lens group and the second lens group such that upon focusing from infinity to a close object, the first lens group and the second lens group are moved along an optical axis independently toward the object side; and disposing each lens in the first lens group such that the first lens group includes, in order from the object side, a front group having negative refractive power and a rear group having positive refractive power, and the front group consists of, in order from the object side, a positive lens and a negative lens.

In the third aspect of the present invention, the following step is preferably included: applying an antireflection coating to at least one optical surface among the first lens group through the third lens group such that the antireflection coating includes at least one layer formed by a wet process.

The present invention makes it possible to provide an imaging lens capable of obtaining excellent optical performance from infinity to a close object with downsizing the optical system with reducing ghost images and flare, an optical apparatus equipped with the imaging lens, and a method for manufacturing the imaging lens.

BRIEF DESCRIPTION OF THE DRAWINGS

FIGS. 2A and 2B are graphs showing various aberrations of the imaging lens according to Example 1, in which FIG. 2A is upon focusing on infinity, and FIG. 2B is upon focusing on a closest shooting distance.

FIG. 3 is a sectional view showing the lens configuration of the lens system according to Example 1 and is an explanatory view, in which light rays reflected from a first-ghost-generating surface are reflected by a second-ghost-generating surface.

FIG. 4 is a sectional view showing a lens configuration of an imaging lens according to Example 2 of the present application.

FIGS. 5A and 5B are graphs showing various aberrations of the imaging lens according to Example 2, in which FIG. 5A is upon focusing on infinity, and FIG. 5B is upon focusing on a closest shooting distance.

FIGS. 7A and 7B are graphs showing various aberrations of the imaging lens according to Example 3, in which FIG. 7A is upon focusing on infinity and FIG. 7B is upon focusing on a closest shooting distance.

FIGS. 9A and 9B are graphs showing various aberrations of the imaging lens according to Example 4, in which FIG. 9A is upon focusing on infinity and FIG. 9B is upon focusing on a closest shooting distance.

FIGS. 11A and 11B are graphs showing various aberrations of the imaging lens according to Example 5, in which FIG. 11A is upon focusing on infinity and FIG. 11B is upon focusing on a closest shooting distance.

DESCRIPTION OF THE MOST PREFERRED EMBODIMENT

Figure 1:
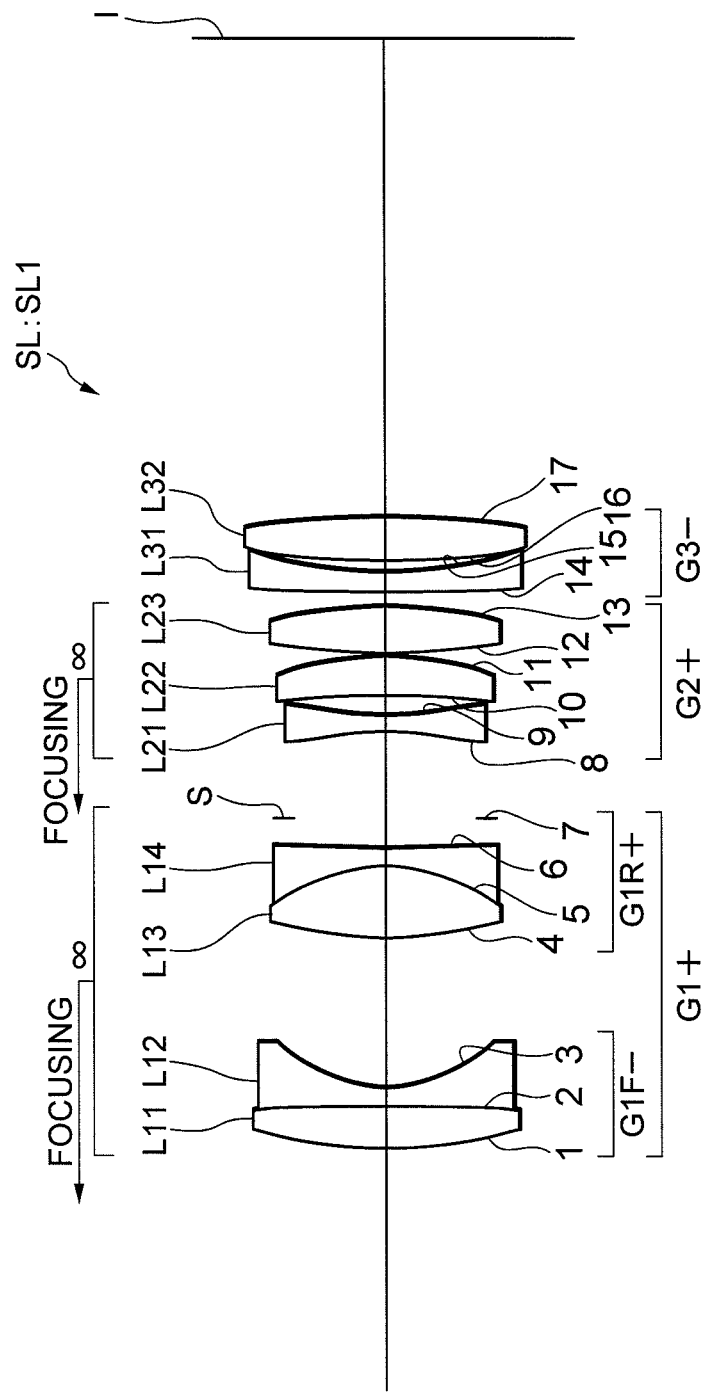
FIG. 1 is a sectional view showing a lens configuration of an imaging lens according to Example 1 of the present application.

A preferred embodiment of the present application is explained below with reference to accompanying drawings. As shown in FIG. 1, an imaging lens SL according to the present embodiment includes, in order from an object side, a first lens group G1 having positive refractive power, an aperture stop S, a second lens group G2 having positive refractive power, a third lens group G3 having negative refractive power. The first lens group G1 includes, in order from the object side, a front group G1F having negative refractive power, and a rear group G1R having positive refractive power. The front group is composed of, in order from the object side, a positive lens and a negative lens.

Upon focusing from infinity to a close object, the first lens group G1 and the second lens group G2 are moved along an optical axis independently toward the object side. With moving two lens groups having positive refractive power independently, it becomes possible to obtain excellent optical performance with suppressing the moving amount of each lens group. Moreover, in the first lens group G1, with disposing the front group G1F having negative refractive power to the object side thereof and the rear group G1R having positive refractive power to the image side thereof, it becomes possible to make a distance between the object and the first lens group large, and to excellently correct distortion from infinity to a close object. In the present embodiment, although the front group G1F is constructed by only two lenses of a positive lens and a negative lens, it becomes possible to obtain excellent optical performance with correcting coma mainly by the positive lens and distortion by the negative lens upon focusing from infinity to a close object.

Moreover, in an imaging lens SL according to the present embodiment, with satisfying the following conditional expressions, it becomes possible to secure excellent optical performance from infinity to a close object with keeping the above-described characteristics.

In an imaging lens SL according to the present embodiment, the following conditional expression (1) is preferably satisfied:

$$1.38 < (-f1F)/f1R < 3.00 \tag{1}$$

where f1F denotes a focal length of the front group G1F, and f1R denotes a focal length of the rear group G1R.

Conditional expression (1) defines refractive power distribution in the first lens group G1 for securing excellent optical performance with suppressing the moving amounts of the first lens group G1 and the second lens group G2 upon focusing on a close object. The first lens group G1 disposes the front group G1F and the rear group G1R with a negative-positive power distribution with disposing negative refractive power to the most object side, thereby making longer in a distance between the object and the negative lens group upon focusing on a close object large. When the value $(-f1F)/f1R$ is equal to or exceeds the upper limit of conditional expression (1), negative refractive power in the first lens group G1 becomes weak, so that spherical aberration and curvature of field can be excellently corrected. However, upon focusing on a close object the distance between the object and the lens becomes small, and negative distortion is generated. In particular, negative distortion upon focusing on a closest shooting range becomes strong, so that it is undesirable in view of optical performance. In order to secure the effect of the present embodiment, it is preferable to set the upper limit of conditional expression (1) to 2.80. In order to further secure the effect of the present embodiment, it is most preferable to set the upper limit of conditional expression (1) to 2.50. On the other hand, when the value $(-f1F)/f1R$ is equal to or falls below the lower limit of conditional expression (1), refractive power of the front group G1F becomes strong. In other words, since negative refractive power in the first lens group G1 becomes strong, upon focusing from infinity to a close object spherical aberration and curvature of field come to be undercorrected, so that it is undesirable. In order to secure the effect of the present embodiment, it is preferable to set the lower limit of conditional expression (1) to 1.40. In order to further secure the effect of the present embodiment, it is most preferable to set the lower limit of conditional expression (1) to 1.45.

In an imaging lens SL according to the present embodiment, the following conditional expression (2) is preferably satisfied:

$$0.50 < f1R/f < 1.20 \tag{2}$$

where f denotes a focal length of the imaging lens upon focusing on infinity.

Similar to conditional expression (1), conditional expression (2) defines refractive power distribution of the first lens group G1 for securing excellent optical performance upon focusing from infinity to a close object. Since conditional expression (1) defines refractive power of the front group G1F in the first lens group G1 and conditional expression (2) defines refractive power of the rear group G1R in the first lens group G1, spherical aberration generated upon focusing on a closest shooting range can be excellently corrected. When the value f1R/f is equal to or exceeds the upper limit of conditional expression (2), spherical aberration becomes undercorrected, so that it is undesirable. In order to secure the effect of the present embodiment, it is preferable to set the upper limit of conditional expression (2) to 1.15. In order to further secure the effect of the present embodiment, it is most preferable to set the upper limit of conditional expression (2) to 1.10. On the other hand, when the value f1R/f is equal to or falls below the lower limit of conditional expression (2), refractive power of the rear group G1R becomes strong, and spherical aberration becomes overcorrected, so that it is undesirable. In order to secure the effect of the present embodiment, it is preferable to set the lower limit of conditional expression (2) to 0.55. In order to further secure the effect of the present embodiment, it is most preferable to set the lower limit of conditional expression (2) to 0.57.

In an imaging lens SL according to the present embodiment, the distance between the first lens group G1 and the second lens group G2 preferably varies upon focusing. With this configuration, curvature of field upon focusing on a close object can be improved.

In an imaging lens SL according to the present embodiment, the following conditional expression (3) is preferably satisfied:

$$4.00 < (-f3)/f1 < 10.00 \quad (3)$$

where f1 denotes a focal length of the first lens group G1, and f3 denotes a focal length of the third lens group G3.

Conditional expression (3) is for excellently correct curvature of field generated in the focusing lens group upon focusing from infinity to a close object by the third lens group G3. When the value (−f3)/f1 is equal to or exceeds the upper limit of conditional expression (3), refractive power of the third lens group G3 becomes weak, and curvature of field becomes overcorrected, so that it is undesirable. In particular, upon focusing on the closest shooting range the tendency of curvature of field becomes strong, so that it is preferable to satisfy conditional expression (3). In order to secure the effect of the present embodiment, it is preferable to set the upper limit of conditional expression (3) to 9.50. In order to further secure the effect of the present embodiment, it is most preferable to set the upper limit of conditional expression (3) to 9.00. On the other hand, when the value (−f3)/f1 is equal to or falls below the lower limit of conditional expression (3), refractive power of the third lens group G3 becomes strong, and a tendency of unercorrection of curvature of field becomes strong, so that it is undesirable. In order to secure the effect of the present embodiment, it is preferable to set the lower limit of conditional expression (3) to 0.405. In order to further secure the effect of the present embodiment, it is most preferable to set the lower limit of conditional expression (3) to 0.410.

In an imaging lens SL according to the present embodiment, the following conditional expression (4) is preferably satisfied:

$$0.20 < dFR/f < 0.33 \quad (4)$$

where dFR denotes a distance along the optical axis between the most image side lens surface of the front group G1F and the most object side lens surface of the rear group G1R.

Conditional expression (4) is for excellently correcting curvature of field and distortion. When the value dFR/f is equal to or exceeds the upper limit of conditional expression (4), the whole lens system becomes large. Moreover, distortion becomes worse, so that it is undesirable. In order to secure the effect of the present embodiment, it is preferable to set the upper limit of conditional expression (4) to 0.320. In order to further secure the effect of the present embodiment, it is most preferable to set the upper limit of conditional expression (4) to 0.315. On the other hand, when the value dFR/f is equal to or falls below the lower limit of conditional expression (4), curvature of field becomes worse, so that it is undesirable. In order to secure the effect of the present embodiment, it is preferable to set the lower limit of conditional expression (4) to 0.250. In order to further secure the effect of the present embodiment, it is most preferable to set the lower limit of conditional expression (4) to 0.280.

In an imaging lens SL according to the present embodiment, the following conditional expression (5) is preferably satisfied:

$$0.40 < (-f1Fn)/f < 0.90 \quad (5)$$

where f1Fn denotes a focal length of a negative lens composing the front group G1F of the first lens group G1, and f denotes a focal length of the imaging lens upon focusing on infinity.

Conditional expression (5) is for excellently correcting aberrations by the two-lens configuration of the front group G1F in the first lens group G1. When the value (−f1Fn)/f is equal to or exceeds the upper limit of conditional expression (5), negative refractive power in the first lens group G1 becomes weak, and negative curvature of field and positive distortion become strong, so that it is undesirable. In order to secure the effect of the present embodiment, it is preferable to set the upper limit of conditional expression (5) to 0.89. In order to further secure the effect of the present embodiment, it is most preferable to set the upper limit of conditional expression (5) to 0.88. On the other hand, when the value (−f1Fn)/f is equal to or falls below the lower limit of conditional expression (5), negative refractive power becomes strong, and a tendency of positive curvature of field becomes strong, so that it is undesirable. In order to secure the effect of the present embodiment, it is preferable to set the lower limit of conditional expression (5) to 0.45. In order to further secure the effect of the present embodiment, it is most preferable to set the lower limit of conditional expression (5) to 0.48.

In an imaging lens SL according to the present embodiment, the following conditional expression (6) is preferably satisfied:

$$0.60 < X1/f < 0.90 \quad (6)$$

where X1 denotes an absolute value of a moving amount of the first lens group G1 along the optical axis upon focusing from infinity to the closest object, and f denotes a focal length of the imaging lens upon focusing on infinity.

Conditional expression (6) defines an appropriate moving amount of the first lens group G1 along the optical axis upon focusing from infinity to the closest object as a focusing lens group. When the value X1/f is equal to or exceeds the upper limit of conditional expression (6), although generation of various aberrations becomes small, the moving amount of the focusing lens group becomes large. Accordingly, the optical system becomes large, so that it is undesirable. In order to secure the effect of the present embodiment, it is preferable to set the upper limit of conditional expression (6) to 0.88. In order to further secure the effect of the present embodiment, it is most preferable to set the upper limit of conditional expression (6) to 0.85. On the other hand, when the value X1/f is equal to or falls below the lower limit of conditional expression (6), although the optical system can be downsized, refractive power of the focusing lens group becomes strong, and various aberrations tend to be generated, so that it is undesirable. In order to secure the effect of the present embodiment, it is preferable to set the lower limit of conditional expression (6) to 0.65. In order to further secure the effect of the present embodiment, it is most preferable to set the lower limit of conditional expression (6) to 0.70.

In an imaging lens SL according to the present embodiment, the following conditional expression (7) is preferably satisfied:

$$0.70 < X2/f < 0.90 \qquad (7)$$

where X2 denotes an absolute value of a moving amount of the second lens group G2 along the optical axis upon focusing from infinity to the closest object, and f denotes a focal length of the imaging lens upon focusing on infinity.

Conditional expression (7) defines an appropriate moving amount of the second lens group G2 along the optical axis upon focusing from infinity to the closest object as a focusing lens group. When the value X2/f is equal to or exceeds the upper limit of conditional expression (7), although generation of various aberrations becomes small, the moving amount of the focusing lens group becomes large. Accordingly, the optical system becomes large, so that it is undesirable. In order to secure the effect of the present embodiment, it is preferable to set the upper limit of conditional expression (7) to 0.88. In order to further secure the effect of the present embodiment, it is most preferable to set the upper limit of conditional expression (7) to 0.85. On the other hand, when the value X2/f is equal to or falls below the lower limit of conditional expression (7), although the optical system can be downsized, refractive power of the focusing lens group becomes strong, and various aberrations tend to be generated, so that it is undesirable. In order to secure the effect of the present embodiment, it is preferable to set the lower limit of conditional expression (7) to 0.71. In order to further secure the effect of the present embodiment, it is most preferable to set the lower limit of conditional expression (7) to 0.72.

In an imaging lens SL according to the present embodiment, introduction of an aspherical surface is effective in improving optical performance. With applying an aspherical lens to the front group G1F in the first lens group G1, it becomes possible to excellently correct coma and distortion from infinity to a close object. With applying an aspherical lens to the positive lens in the rear group G1R in the first lens group G1 or to the second lens group G2, it becomes possible to suppress spherical aberration from infinity to a close object.

Then, an imaging lens SL seen from another point of view according to the present embodiment includes, in order from an object side, a first lens group having positive refractive power, an aperture stop S, a second lens group having positive refractive power, and a third lens group having negative refractive power. The first lens group includes, in order from the object side, a front group having negative refractive power and a rear group having positive refractive power. The front group includes, in order from the object side, a positive lens and a negative lens.

Upon focusing from an infinity object to a close object, the first lens group and the second lens group, which are a focusing lens group, are moved independently along an optical axis toward the object side. In an imaging lens seen from another point of view according to the present embodiment, with downsizing by the three-lens-group configuration and with moving the first lens group and the second lens group independently, it becomes possible to obtain high optical performance from an infinity object to a close object. Moreover, since two positive lens groups are moved independently upon focusing, it becomes possible to obtain excellent optical performance with suppressing a moving amount of each lens group.

Moreover, with disposing the front group having negative refractive power to the object side and the rear group having positive refractive power to the image side, a distance between an object and the first lens group is made to be large, so that distortion upon focusing from an infinity object to a close object can be excellently corrected. In an imaging lens seen from another point of view according to the present embodiment, with composing the front group by two lenses of a positive lens and a negative lens, it becomes possible to realize excellent optical performance upon focusing from an infinity object to a close object with correcting coma mainly by the positive lens and distortion by the negative lens.

In an imaging lens seen from another point of view according to the present embodiment, at least one optical surface in the first lens group through the third lens group is applied with an antireflection coating, and the antireflection coating includes at least one layer that is formed by a wet process. With configuring in this manner, an imaging lens according to the present embodiment makes it possible to realize high optical performance with suppressing ghost images and flare generated by reflecting light rays from the object by optical surfaces.

In an imaging lens seen from another point of view according to the present embodiment, the antireflection coating is a multilayer film, and the layer formed by the wet process is preferably the outermost layer among the layers composing the multilayer coating. With this configuration, since difference in refractive index with respect to the air can be small, reflection of light can be small, so that ghost images and flare can further be suppressed.

In an imaging lens seen from another point of view according to the present embodiment, when a refractive index at d-line of the layer formed by the wet process is denoted by nd, the refractive index nd is preferable 1.30 or lower. With this configuration, since difference in refractive index with respect to the air can be small, reflection of light can be small, so that ghost images and flare can further be suppressed.

In an imaging lens seen from another point of view according to the present embodiment, an optical surface on which the antireflection coating is formed is preferably at least one optical surface among the first lens group and the second lens group, and the optical surface is preferably a concave surface seen from the aperture stop. Since ghost images are liable to be generated on a concave surface seen from the aperture stop, with applying an antireflection coating to such an optical surface, ghost images and flare can effectively be suppressed.

In an imaging lens seen from another point of view according to the present embodiment, the concave surface on which the antireflection coating is formed is preferably an image side lens surface. Since ghost images are liable to be generated on a concave surface seen from the aperture stop, with applying an antireflection coating to such an optical surface, ghost images and flare can effectively be suppressed.

In an imaging lens seen from another point of view according to the present embodiment, the concave surface on which the antireflection coating is formed is preferably an object side lens surface. Since ghost images are liable to be generated on a concave surface seen from the aperture stop, with applying an antireflection coating to such an optical surface, ghost images and flare can effectively be suppressed.

In an imaging lens seen from another point of view according to the present embodiment, the optical surface on which the antireflection coating is formed is preferably at least one surface of the third lens group, and the optical surface is preferably a concave surface seen from the image plane. Since ghost images are liable to be generated on a concave surface seen from the image plane, with applying an antireflection coating to such an optical surface, ghost images and flare can effectively be suppressed.

In an imaging lens seen from another point of view according to the present embodiment, the concave surface, seen from the image plane, on which the antireflection coating is formed, is preferably an image side lens surface. Since ghost images are liable to be generated on a concave surface seen from the image plane, with applying an antireflection coating to such an optical surface, ghost images and flare can effectively be suppressed.

In an imaging lens seen from another point of view according to the present embodiment, the concave surface, seen from the image plane, on which the antireflection coating is formed, is preferably an object side lens surface. Since ghost images are liable to be generated on a concave surface seen from the image plane, with applying an antireflection coating to such an optical surface, ghost images and flare can effectively be suppressed.

Incidentally, in an imaging lens seen from another point of view according to the present embodiment, the antireflection coating is not limited to the wet process, the antireflection coating may be formed by a dry-process or the like. In this instance, the antireflection coating preferably includes at least one layer whose refractive index is 1.30 or less. With including at least one layer whose refractive index is 1.30 or less formed by a dry-process or the like in the antireflection coating, the same effect as the case formed by the wet process can be obtained. In this case, the layer, composing the multi-layer coating, whose refractive index is 1.30 or less is preferably the outermost layer.

In an imaging lens seen from another point of view according to the present embodiment, the following conditional expression (1) is preferably satisfied:

$$1.38 < (-f1F)/f1R < 3.00 \quad (1)$$

where f1F denotes a focal length of the front group G1F, and f1R denotes a focal length of the rear group G1R.

Conditional expression (1) defines an appropriate range of a ratio of a focal length of the front group to that of the rear group in the first lens group. However, conditional expression (1) has already explained above, so that duplicated explanations are omitted.

In an imaging lens seen from another point of view according to the present embodiment, the following conditional expression (2) is preferably satisfied:

$$0.50 < f1R/f < 1.20 \quad (2)$$

where f1R denotes a focal length of the rear group, and f denotes a focal length of the imaging lens upon focusing on infinity.

Conditional expression (2) defines a focal length of the rear group in the first lens group with respect to a focal length of the imaging lens upon focusing on infinity. However, conditional expression (2) has already explained above, so that duplicated explanations are omitted.

In an imaging lens seen from another point of view according to the present embodiment, a distance between the first lens group and the second lens group preferably varies upon focusing. With this configuration, curvature of field upon focusing on a close object can be improved.

In an imaging lens seen from another point of view according to the present embodiment, the following conditional expression (3) is preferably satisfied:

$$4.00 < (-f3)/f1 < 10.00 \quad (3)$$

where f1 denotes a focal length of the first lens group G1, and f3 denotes a focal length of the third lens group G3.

Conditional expression (3) defines an appropriate range of a ratio of a focal length of the first lens group to a focal length of the third lens group. However, conditional expression (3) has already explained above, so that duplicated explanations are omitted.

In an imaging lens seen from another point of view according to the present embodiment, the following conditional expression (4) is preferably satisfied:

$$0.20 < dFR/f < 0.33 \quad (4)$$

where dFR denotes a distance along the optical axis between the most image side lens surface of the front group G1F and the most object side lens surface of the rear group G1R.

Conditional expression (4) defines a distance along the optical axis between the front group and the rear group. However, conditional expression (4) has already explained above, so that duplicated explanations are omitted.

In an imaging lens seen from another point of view according to the present embodiment, the following conditional expression (5) is preferably satisfied:

$$0.40 < (-f1Fn)/f < 0.90 \quad (5)$$

where f1Fn denotes a focal length of a negative lens composing the front group G1F of the first lens group G1, and f denotes a focal length of the imaging lens upon focusing on infinity.

Conditional expression (5) defines an appropriate range of a ratio of a focal length of the negative lens composing the front group in the first lens group to a focal length of the imaging lens upon focusing on infinity. However, conditional expression (5) has already explained above, so that duplicated explanations are omitted.

In an imaging lens seen from another point of view according to the present embodiment, the following conditional expression (6) is preferably satisfied:

$$0.60 < X1/f < 0.90 \quad (6)$$

where X1 denotes an absolute value of a moving amount of the first lens group G1 along the optical axis upon focusing from infinity to the closest object, and f denotes a focal length of the imaging lens upon focusing on infinity.

Conditional expression (6) defines an absolute value of a moving amount of the first lens group G1 along the optical axis upon focusing from infinity to the closest object with respect to a focal length of the imaging lens upon focusing on infinity. However, conditional expression (6) has already explained above, so that duplicated explanations are omitted.

In an imaging lens seen from another point of view according to the present embodiment, the following conditional expression (7) is preferably satisfied:

$$0.70 < X2/f < 0.90 \quad (7)$$

where X2 denotes an absolute value of a moving amount of the second lens group G2 along the optical axis upon focusing from infinity to the closest object, and f denotes a focal length of the imaging lens upon focusing on infinity.

Conditional expression (7) defines an absolute value of a moving amount of the second lens group along the optical axis upon focusing from infinity to the closest object with respect to a focal length of the imaging lens upon focusing on infinity. However, conditional expression (7) has already explained above, so that duplicated explanations are omitted.

In an imaging lens seen from another point of view according to the present embodiment, an aspherical lens is preferably disposed in at least one of the front group, the rear group of the first lens group, and the second lens group. With disposing an aspherical lens in the front group in the first lens group, it becomes possible to excellently correct coma and distortion upon focusing from infinity to a close object. Moreover, when an aspherical lens is included in the positive lens in the rear group in the first lens group or in the second lens group, spherical aberration upon focusing from an infinity object to a close object can be excellently corrected.

Figure 12:
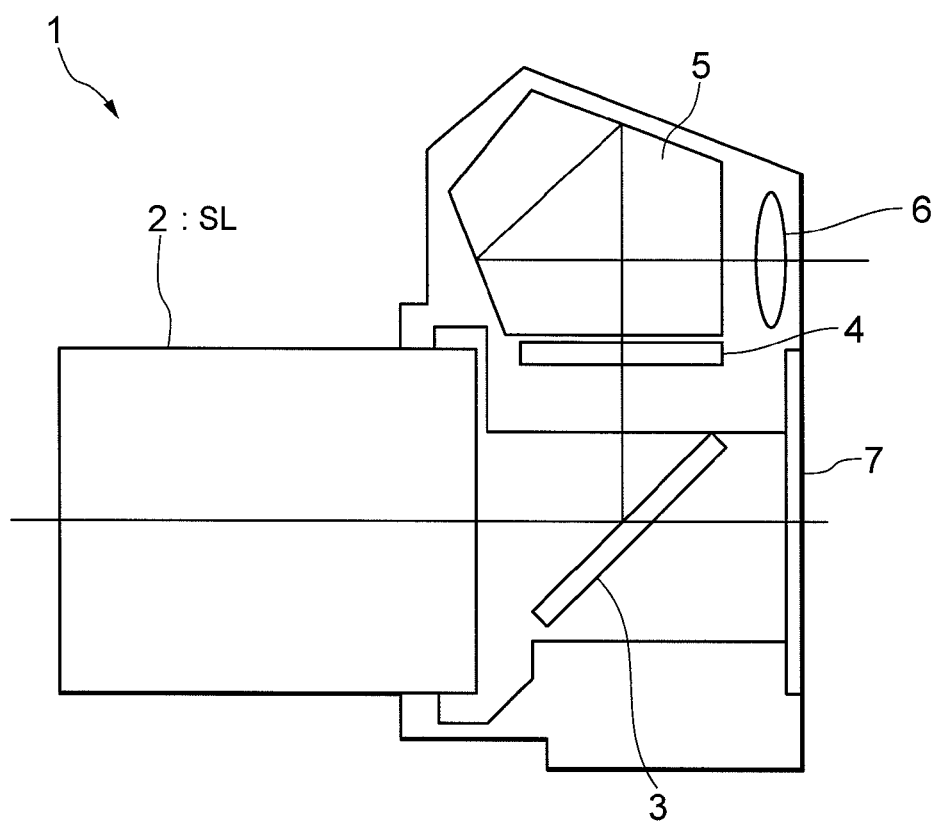
FIG. 12 is a sectional view showing a single-lens reflex digital camera equipped with an imaging lens according to the present embodiment.

Then, a schematic sectional view of a single-lens reflex digital camera 1 (hereinafter simply called as a camera), which is an optical apparatus equipped with the above-described imaging lens SL according to the present embodiment, is shown in FIG. 12. In the camera 1, light emitted from an unillustrated object is converged by the imaging lens 2 (imaging lens SL), and focused on a focusing screen 4 through a quick return mirror 3. The light focused on the focusing screen 4 is reflected a plurality of times in a pentagonal roof prism 5, and led to an eyepiece 6. Accordingly, a photographer can observe the object image as an erected image through the eyepiece 6.

When the photographer presses an unillustrated release button all the way down, the quick return mirror 3 is retracted from the optical path, and the light from the unillustrated object is formed an object image on an imaging device 7. Accordingly, the light emitted from the object is captured by the imaging device 7, and stored in an unillustrated memory as a photographed image of the object. In this manner, the photographer can take a picture of an object by the camera 1. Incidentally, the camera 1 shown in FIG. 12 may be constructed to removably hold the imaging lens SL, or may be constructed in a body with the imaging lens SL. The camera 1 may be a so-called single-lens reflex camera, or a compact camera, which does not include a quick return mirror or the like.

Figure 13:
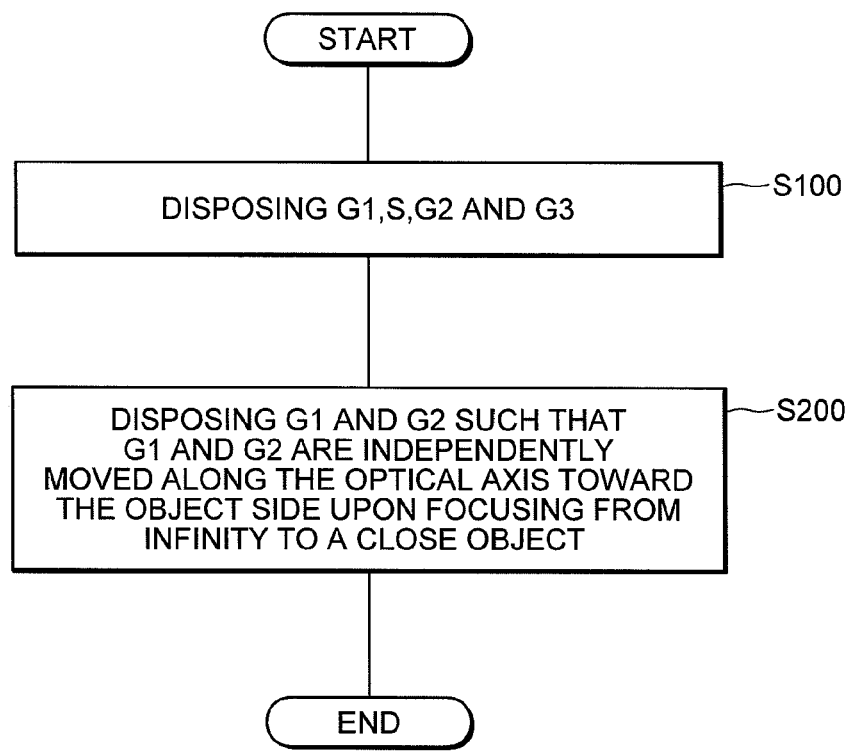
FIG. 13 is a flowchart showing a method for manufacturing an imaging lens according to the present embodiment.

An outline of a method for manufacturing an imaging lens SL according to the present embodiment is explained below with reference to FIG. 13. At first, each lens group is provided by disposing each lens (Step S100). Specifically, in the present embodiment, for example, in order from an object side, a cemented lens constructed by a double convex positive lens L11 cemented with a double concave negative lens L12 is disposed as a front group G1F in the first lens group G1, in order from the object side, a cemented lens constructed by a double convex positive lens L13 cemented with a double concave negative lens L14 is disposed as a rear group G1R in the first lens group G1, an aperture stop S is disposed to the image side of the rear group G1R, in order from the object side, a double concave negative lens L21, a positive meniscus lens L22 having a convex surface facing the image side, and a double convex positive lens L23 are disposed as a second lens group G2, and, in order from the object side, a negative meniscus lens L31 having a concave surface facing the image side, and a double convex positive lens L32 are disposed as a third lens group G3. Each lens group provided in this manner is disposed thereby manufacturing an imaging lens SL.

In this instance, the first lens group G1 and the second lens group G2 are disposed such that the first lens group G1 and the second lens group G2 are independently moved along the optical axis toward the object side upon focusing from infinity to a close object (Step S200).

Each example according to the present embodiment is explained below. Lens configurations of the imaging lens SL1 through SL5 are shown in FIGS. 1, 4, 6, 8 and 10, respectively.

Example 1

As shown in FIG. 1, the imaging lens SL1 is composed of, in order from an object side, a first lens group G1 having positive refractive power, an aperture stop S, a second lens group G2 having positive refractive power, and a third lens group G3 having negative refractive power. Upon focusing from an infinity object to a close object, the first lens group G1 and the second lens group G2 (focusing lens group) are moved independently toward the object side along the optical axis, thereby focusing on an object disposed at a finite distance.

The first lens group G1 is composed of, in order from the object side, a front group G1F having negative refractive power, and a rear group G1R having positive refractive power. The front group G1F is composed of a cemented lens constructed by, in order from the object side, a double convex positive lens L11 cemented with a double concave negative lens L12. The cemented lens may be constructed by a positive meniscus lens cemented with a negative meniscus lens. In the double concave negative lens L12, with making shorter the absolute value of the radius of curvature of the image side lens surface than that of the object side lens surface, it becomes possible to correct coma and distortion upon focusing from an infinity object to a close object. The rear group G1R is composed of a cemented lens constructed by, in order from the object side, a double convex positive lens L13 cemented with a double concave negative lens L14. In this manner, with disposing the front group G1F having negative refractive power to the object side, it becomes possible to make longer the distance between the object and the double convex positive lens L11 upon focusing by moving the first lens group G1 to the object side.

The second lens group G2 is composed of three lenses that are, in order from the object side, a double concave negative lens L21, a positive meniscus lens L22 having a convex surface facing the image side, and a double convex positive lens L23. Since the first lens group G1 has positive refractive power, light rays come out from the object are incident on the second lens group G2 as converging light rays, so that with disposing the double concave negative lens L21, the light rays are temporarily diverged. Then, with disposing the positive meniscus lens L22 and the double convex positive lens L23 to the image side thereof, spherical aberration and coma are excellently corrected.

The third lens group G3 is composed of, in order from the object side, a negative meniscus lens L31 having a concave surface facing the image side, and a double convex positive lens L32, thereby securing a sufficient back focal length and correcting curvature of field. The third lens group G3 may be a positive lens and a negative lens in this order.

An aperture stop S is disposed between the rear group G1R in the first lens group G1 and the second lens group G2. Incidentally, the aperture stop S may be disposed between the front group G1F and the rear group G1R in the first lens group G1. Alternatively, the aperture stop S may be disposed in the second lens group G2.

Various values associated with the imaging lens SL1 according to Example 1 are listed in Table 1.

In Table 1, f denotes a focal length of the imaging lens upon focusing on infinity, FNO denotes an f-number, ω denotes a half angle of view (unit: degree), and Bf denotes a back focal length. In (Lens Data), the left most column "i" shows an optical surface number counted in order from the object side along a direction of propagating light ray, the second column "r" shows a radius of curvature of an optical surface, the third column "d" shows a distance to the next optical surface along an optical axis, the fourth column "nd" shows refractive index at d-line (wavelength λ=587.6 nm), and the fifth column "vd" shows an Abbe number at d-line (wavelength λ=587.6 nm). In the fourth column "nd" refractive index of the air nd=1.000000 is omitted. In the second column "r", r=∞ indicates a plane surface. In (Variable Distances), β denotes a shooting magnification, d0 denotes a distance between an object and the first lens group G1, "INF" indicates a state upon focusing on infinity (β=0), "MID" indicates a state upon focusing on an intermediate shooting distance (β=−0.5), and "CLD" indicates a state upon focusing on the closest shooting range (β=−1.0). In (Values for Conditional Expressions), values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used.

The explanation of reference symbols is the same in the other Examples.

TABLE 1

(Specifications)

FNO = 2.887
f = 40
ω = 20.479
Y = 15.00
Bf = 39.818
TL = 92.518

(Lens Data)

| i | r | d | nd | νd |
|---|---|---|---|---|
| 1 | 39.6938 | 3.5 | 1.743997 | 44.79 |
| 2 | −216.2230 | 1.5 | 1.516330 | 64.14 |
| 3 | 13.1290 | 12.5 | | |
| 4 | 34.1159 | 6.1 | 1.699998 | 48.08 |
| 5 | −14.9811 | 1.5 | 1.581439 | 40.75 |
| 6 | 265.8581 | 2.5 | | |
| 7 | ∞ | (d7) | Aperture Stop S | |
| 8 | −33.7748 | 1.4 | 1.740769 | 27.79 |
| 9 | 41.5423 | 1.7 | | |
| 10 | −60.0662 | 3.3 | 1.651597 | 58.55 |
| 11 | −26.1423 | 0.2 | | |
| 12 | 54.7001 | 3.9 | 1.740999 | 52.64 |
| 13 | −34.9008 | (d13) | | |
| 14 | 229.2568 | 1.6 | 1.772499 | 49.60 |
| 15 | 37.7106 | 1.0 | | |
| 16 | 70.8279 | 3.6 | 1.548141 | 45.78 |
| 17 | −91.4184 | 39.8 | | |

(Variable Distances)

| | INF | MID | CLD |
|---|---|---|---|
| β = | 0 | −0.5 | −1.0 |
| d0 = | ∞ | 78.087 | 38.206 |
| d7 = | 7.200 | 6.688 | 7.253 |
| d13 = | 1.200 | 16.234 | 31.200 |

(Values for Conditional Expressions)

(1) (−f1F)/f1R = 1.49
(2) f1R/f = 0.966
(3) (−f3)/f1 = 4.38
(4) dFR/f = 0.313
(5) (−f1Fn)/f = 0.60
(6) X1/f = 0.751
(7) X2/f = 0.750

FIGS. 2A and 2B are graphs showing various aberrations of the imaging lens according to Example 1, in which FIG. 2A is upon focusing on infinity, and FIG. 2B is upon focusing on a closest shooting distance.

In graphs showing astigmatism, a solid line indicates a sagittal image plane, and a broken line indicates a meridional image plane. In respective graphs, FNO denotes an f-number, NA denotes a numerical aperture on the object side upon focusing on the closest shooting range, Y denotes an image height. In respective graphs, d denotes an aberration curve at d-line (wavelength λ=587.6 nm), and g denotes an aberration curve at g-line (wavelength λ=435.8 nm).

As is apparent from various graphs, the imaging lens according to Example 1 shows superb optical performance as a result of good corrections to various aberrations over entire focusing range from infinity to a close object in spite of configuring each lens group with extremely fewer numbers of lenses. Moreover, variation in distortion is small.

FIG. 3 is a sectional view showing the lens configuration of the lens system according to Example 1 and is an explanatory view, in which light rays BM incident from the object side generates ghost images.

As shown in FIG. 3, when a light beam BM from an object is incident on the imaging lens SL1, the beam is reflected by the object side lens surface (a first-ghost-generating surface whose surface number is 14) of the negative meniscus lens L31, and the reflected light beam is reflected again by the image side surface (a second-ghost-generating surface whose surface number is 11) of the positive meniscus lens L22 to reach the image plane I with generating ghost images. Incidentally, the first-ghost-generating surface (surface number 14) is a concave surface seen from the image plane I, and the second-ghost-generating surface (surface number 11) is a concave surface seen from the aperture stop. With forming an antireflection coating corresponding to a broad wavelength range and wide angle of incidence, it becomes possible to effectively suppress ghost images.

Example 2

FIG. 4 is a sectional view showing a lens configuration of an imaging lens SL2 according to Example 2 of the present application. The imaging lens SL2 according to Example 2 is composed of, in order from an object side, a first lens group G1 having positive refractive power, an aperture stop S, a second lens group G2 having positive refractive power, and a third lens group G3 having negative refractive power. Upon focusing from an infinity object to a close object, the first lens group G1 and the second lens group G2 (focusing lens group) are moved independently toward the object side along the optical axis, thereby focusing on an object disposed at a finite distance.

The first lens group G1 is composed of, in order from the object side, a front group G1F having negative refractive power, and a rear group G1R having positive refractive power. The front group G1F is composed of, in order from the object side, a positive meniscus lens L11 having a convex surface facing the object side, and a negative meniscus lens L12 having a concave surface facing the object side with an smaller absolute value of a radius of curvature of the image side surface than that of the object side surface. With constructing the front group G1F in this manner, it becomes possible to excellently correct coma and distortion with securing negative refractive power. The rear group G1R is composed of a cemented lens constructed by, in order from the object side, a double convex positive lens L13 cemented with a double concave negative lens L14 having a smaller absolute value of a radius of curvature of the object side surface than that of the image side surface. With constructing the rear group G1R in this manner, it becomes possible to correct spherical aberration and longitudinal chromatic aberration with securing strong positive refractive power.

The second lens group G2 is composed of, in order from the object side, an aperture stop S, a double concave negative lens L21, a positive meniscus lens L22 having a convex surface facing the image side, and a double convex positive lens L23. Since the first lens group G1 has positive refractive power, light rays come out from the object are incident on the second lens group G2 as converging light rays, so that with disposing the double concave negative lens L21, the light rays are temporarily diverged. Then, with disposing the positive meniscus lens L22 and the double convex positive lens L23 to the image side thereof, spherical aberration and coma are excellently corrected.

The third lens group G3 is composed of, in order from the object side, a double concave negative lens L31 having a smaller absolute value of a radius of curvature of the image side surface than that of the object side surface, and a double convex positive lens L32, thereby securing a sufficient back focal length and correcting curvature of field.

Various values associated with the imaging lens SL2 according to Example 2 are listed in Table 2.

TABLE 2

(Specifications)

FNO = 2.887
f = 40
Y = 15.00
ω = 20.479
Bf = 39.818
TL = 92.122

(Lens Data)

| i | r | d | nd | νd |
|---|---|---|---|---|
| 1 | 34.4867 | 3.4 | 1.805181 | 25.42 |
| 2 | 52.7011 | 0.3 | | |
| 3 | 29.4779 | 1.9 | 1.743997 | 44.79 |
| 4 | 13.3614 | 12.5 | | |
| 5 | 36.4689 | 6.1 | 1.772499 | 49.60 |
| 6 | −17.2077 | 1.5 | 1.548141 | 45.78 |
| 7 | 118.9407 | (d7) | | |
| 8 | ∞ | 7.2 | Aperture Stop S | |
| 9 | −25.3642 | 1.4 | 1.740769 | 27.79 |
| 10 | 44.3873 | 1.7 | | |
| 11 | −58.1179 | 3.3 | 1.651597 | 58.55 |
| 12 | −23.8313 | 0.2 | | |
| 13 | 56.5111 | 3.9 | 1.740999 | 52.64 |
| 14 | −33.0293 | (d14) | | |
| 15 | −707.1640 | 1.6 | 1.772499 | 49.60 |
| 16 | 38.5522 | 0.8 | | |
| 17 | 58.7991 | 3.0 | 1.548141 | 45.78 |
| 18 | −64.8622 | 39.8 | | |

[Variable Distances]

| | INF | MID | CLD |
|---|---|---|---|
| β = | 0 | −0.5 | −1.0 |
| d0 = | ∞ | 77.315 | 37.556 |
| d7 = | 2.404 | 1.780 | 2.335 |
| d14 = | 1.100 | 16.186 | 31.100 |

(Values for Conditional Expressions)

(1) (−f1F)/f1R = 1.63
(2) f1R/f = 0.768
(3) (−f3)/f1 = 5.43
(4) dFR/f = 0.313
(5) (−f1Fn)/f = 0.86
(6) X1/f = 0.748
(7) X2/f = 0.750

Figure 5A:
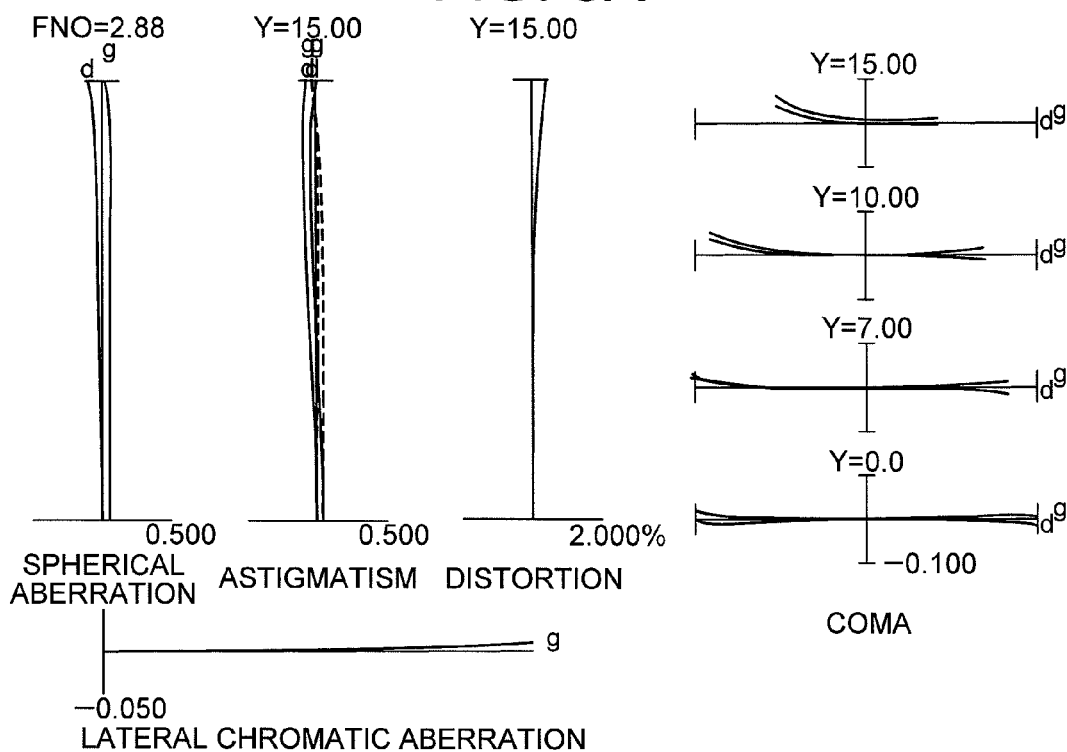
Figure 5B:
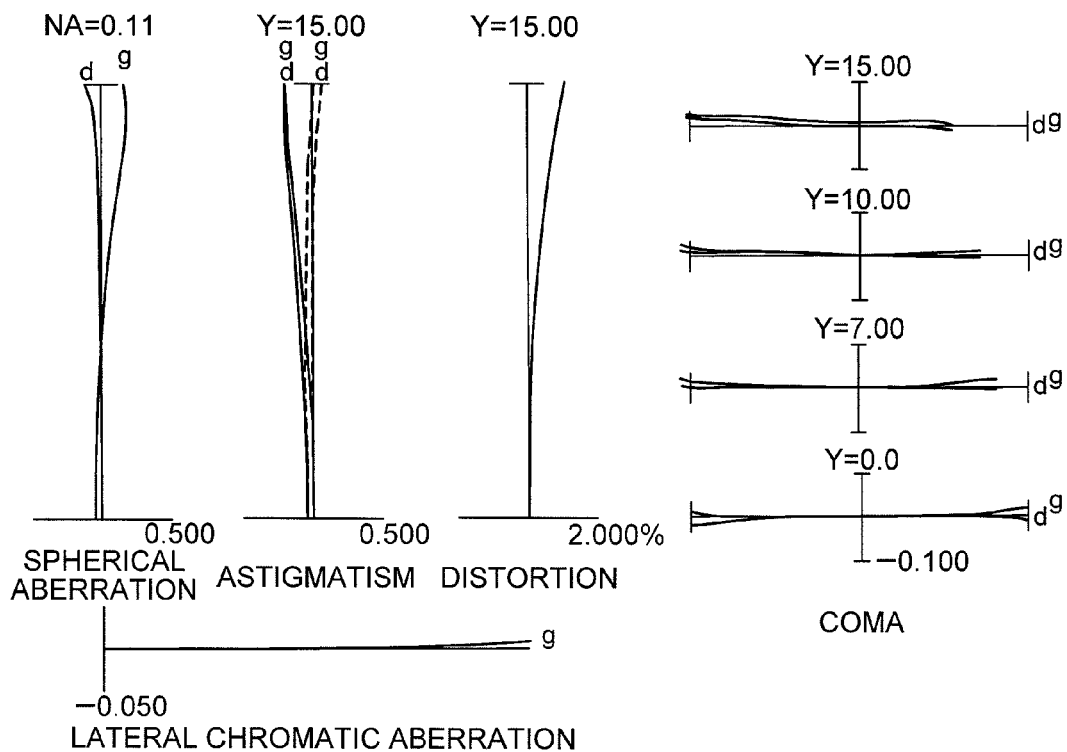

FIGS. 5A and 5B are graphs showing various aberrations of the imaging lens according to Example 2, in which FIG. 5A is upon focusing on infinity, and FIG. 5B is upon focusing on a closest shooting distance.

As is apparent from various graphs, the imaging lens according to Example 2 shows superb optical performance as a result of good corrections to various aberrations over entire focusing range from infinity to a close object in spite of configuring each lens group with extremely fewer numbers of lenses. Moreover, variation in distortion is small.

Example 3

Figure 6:
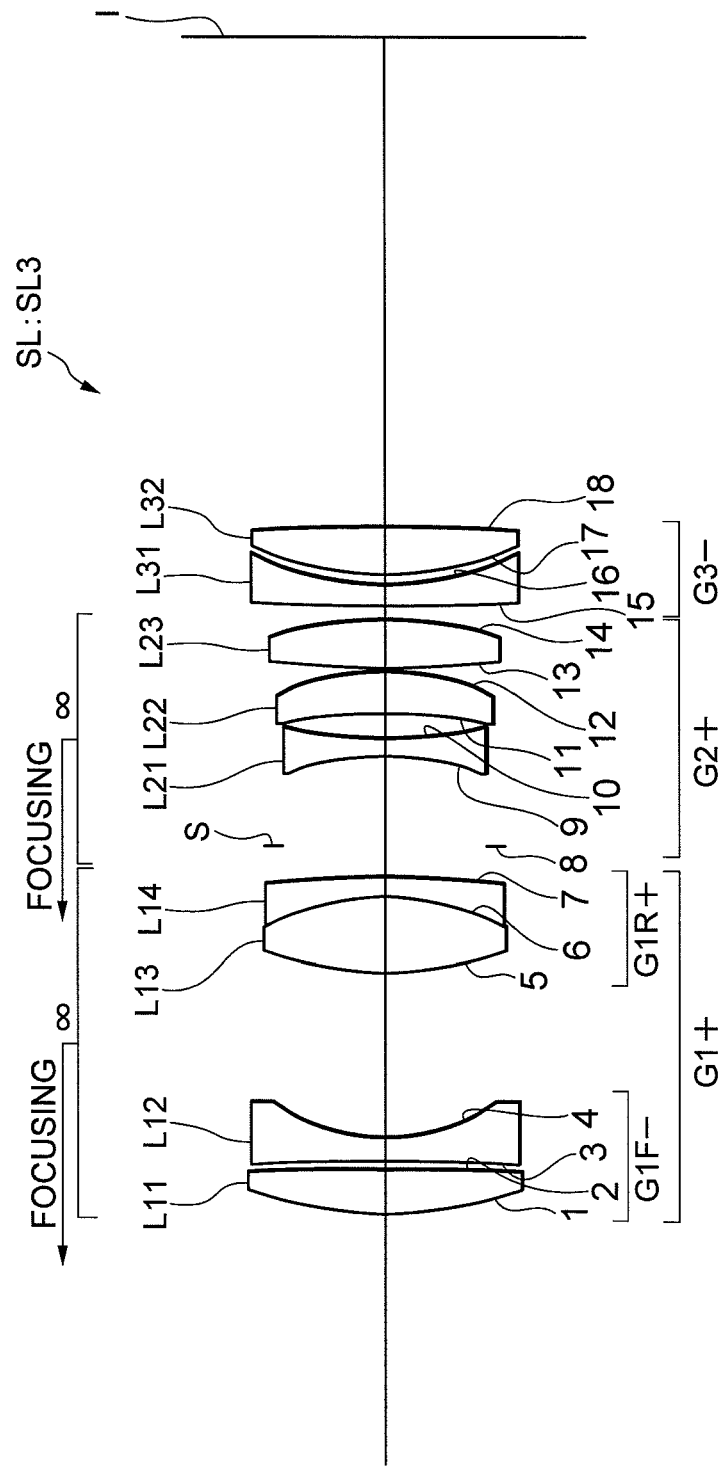
FIG. 6 is a sectional view showing a lens configuration of an imaging lens according to Example 3 of the present application.

FIG. 6 is a sectional view showing a lens configuration of an imaging lens SL3 according to Example 3 of the present application. The imaging lens SL3 according to Example 3 is composed of, in order from an object side, a first lens group G1 having positive refractive power, an aperture stop S, a second lens group G2 having positive refractive power, and a third lens group G3 having negative refractive power. Upon focusing from an infinity object to a close object, the first lens group G1 and the second lens group G2 (focusing lens group) are moved independently toward the object side along the optical axis, thereby focusing on an object disposed at a finite distance.

The first lens group G1 is composed of, in order from the object side, a front group G1F having negative refractive power, and a rear group G1R having positive refractive power. The front group G1F is composed of, in order from the object side, a double convex positive lens L11 having a smaller absolute value of a radius of curvature of the object side surface than that of the image side surface, and a double concave negative lens L12 having a smaller absolute value of radius of curvature of the image side surface than that of the object side surface. With constructing the front group G1F in this manner, it becomes possible to excellently correct coma and distortion with securing negative refractive power. The rear group G1R is composed of a cemented lens constructed by, in order from the object side, a double convex positive lens L13 cemented with a negative meniscus lens L14 having a concave surface facing the object side and having a smaller absolute value of a radius of curvature of the object side surface than that of the image side surface. With constructing the rear group G1R in this manner, it becomes possible to correct spherical aberration and longitudinal chromatic aberration with securing strong positive refractive power.

The second lens group G2 is composed of, in order from the object side, an aperture stop S, a double concave negative lens L21, a positive meniscus lens L22 having a convex surface facing the image side, and a double convex positive lens L23. Since the first lens group G1 has positive refractive power, light rays come out from the object are incident on the second lens group G2 as converging light rays, so that with disposing the double concave negative lens L21, the light rays are temporarily diverged. Then, with disposing the positive meniscus lens L22 and the double convex positive lens L23 to the image side thereof, spherical aberration and coma are excellently corrected.

The third lens group G3 is composed of, in order from the object side, a negative meniscus lens L31 having a concave surface facing the image side and having a smaller absolute value of a radius of curvature of the image side surface than that of the object side surface, and a double convex positive lens L32, thereby securing a sufficient back focal length and correcting curvature of field.

Various values associated with the imaging lens SL3 according to Example 3 are listed in Table 3.

TABLE 3

(Specifications)

FNO = 2.892
f = 45
ω = 18.456
Y = 15.00
Bf = 38.500
TL = 92.908

(Lens Data)

| i | r | d | nd | vd |
|---|---|---|---|---|
| 1 | 34.8272 | 3.4 | 1.805181 | 25.42 |
| 2 | −1179.9200 | 0.8 | | |
| 3 | −155.4560 | 1.9 | 1.698947 | 30.13 |
| 4 | 16.7393 | 13.0 | | |
| 5 | 30.1013 | 6.1 | 1.743997 | 44.79 |
| 6 | −21.1253 | 1.5 | 1.581439 | 40.75 |
| 7 | −84.6331 | (d7) | | |
| 8 | ∞ | 7.2 | Aperture Stop S | |
| 9 | −21.7172 | 1.4 | 1.740769 | 27.79 |
| 10 | 41.7635 | 2.0 | | |
| 11 | −37.1989 | 3.3 | 1.651597 | 58.55 |
| 12 | −22.6795 | 0.2 | | |
| 13 | 74.3167 | 3.9 | 1.740999 | 52.64 |
| 14 | −32.1787 | (d14) | | |
| 15 | 290.1463 | 1.6 | 1.772499 | 49.60 |
| 16 | 25.4736 | 0.8 | | |
| 17 | 26.4901 | 3.8 | 1.548141 | 45.78 |
| 18 | −153.8880 | 38.5 | | |

(Variable Distances)

| | INF | MID | CLD |
|---|---|---|---|
| β = | 0 | −0.5 | −1.0 |
| d0 = | ∞ | 92.212 | 47.351 |
| d7 = | 2.406 | 1.874 | 1.653 |
| d14 = | 1.102 | 18.798 | 36.100 |

(Values for Conditional Expressions)

(1) (−f1F)/f1R = 1.70
(2) f1R/f = 0.700
(3) (−f3)/f1 = 9.36
(4) dFR/f = 0.289
(5) (−f1Fn)/f = 0.48
(6) X1/f = 0.761
(7) X2/f = 0.778

Figure 7A:
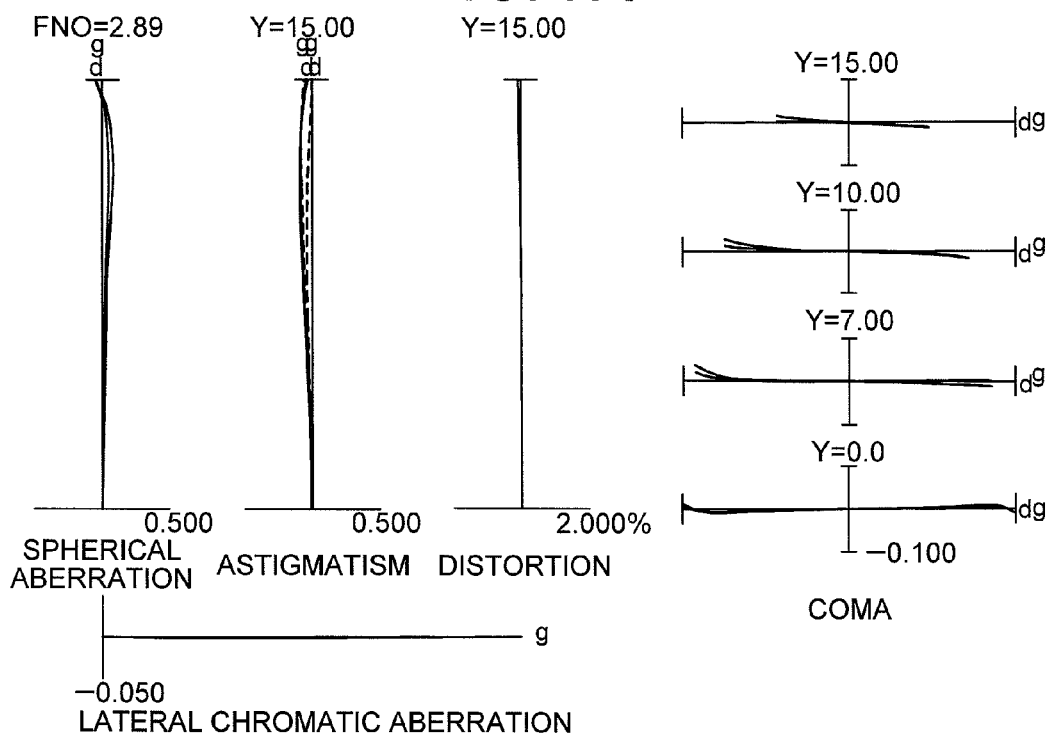
Figure 7B:
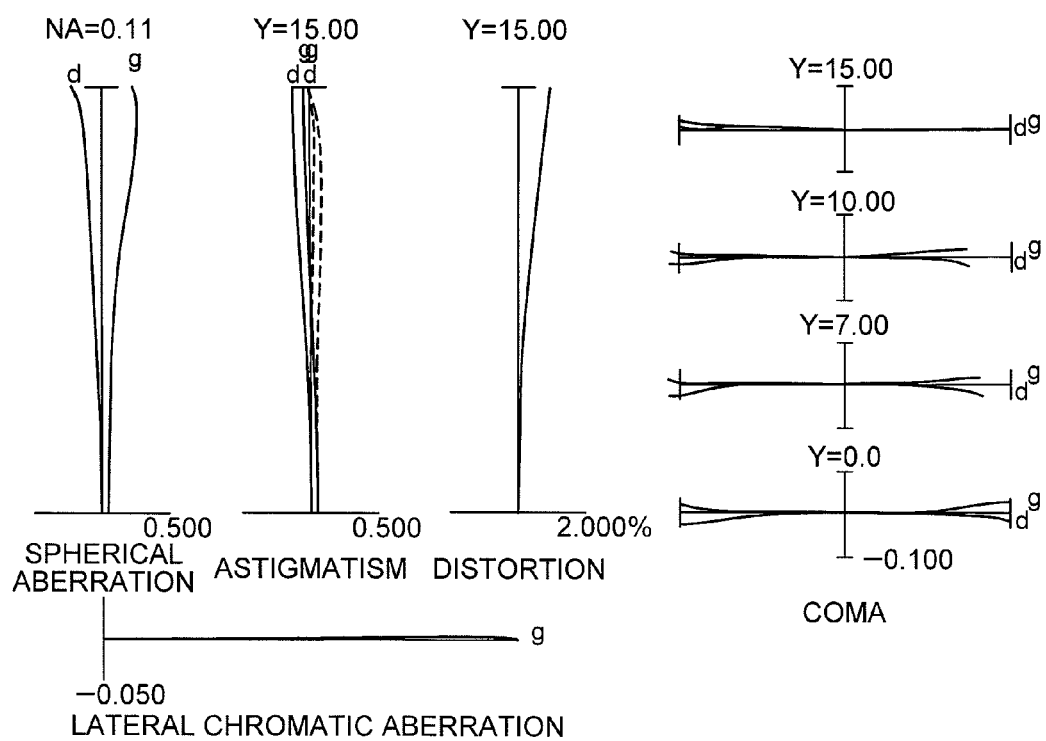

FIGS. 7A and 7B are graphs showing various aberrations of the imaging lens according to Example 3, in which FIG. 7A is upon focusing on infinity and FIG. 7B is upon focusing on a closest shooting distance.

As is apparent from various graphs, the imaging lens according to Example 3 shows superb optical performance as a result of good corrections to various aberrations over entire focusing range from infinity to a close object in spite of configuring each lens group with extremely fewer numbers of lenses. Moreover, variation in distortion is small.

Example 4

Figure 8:
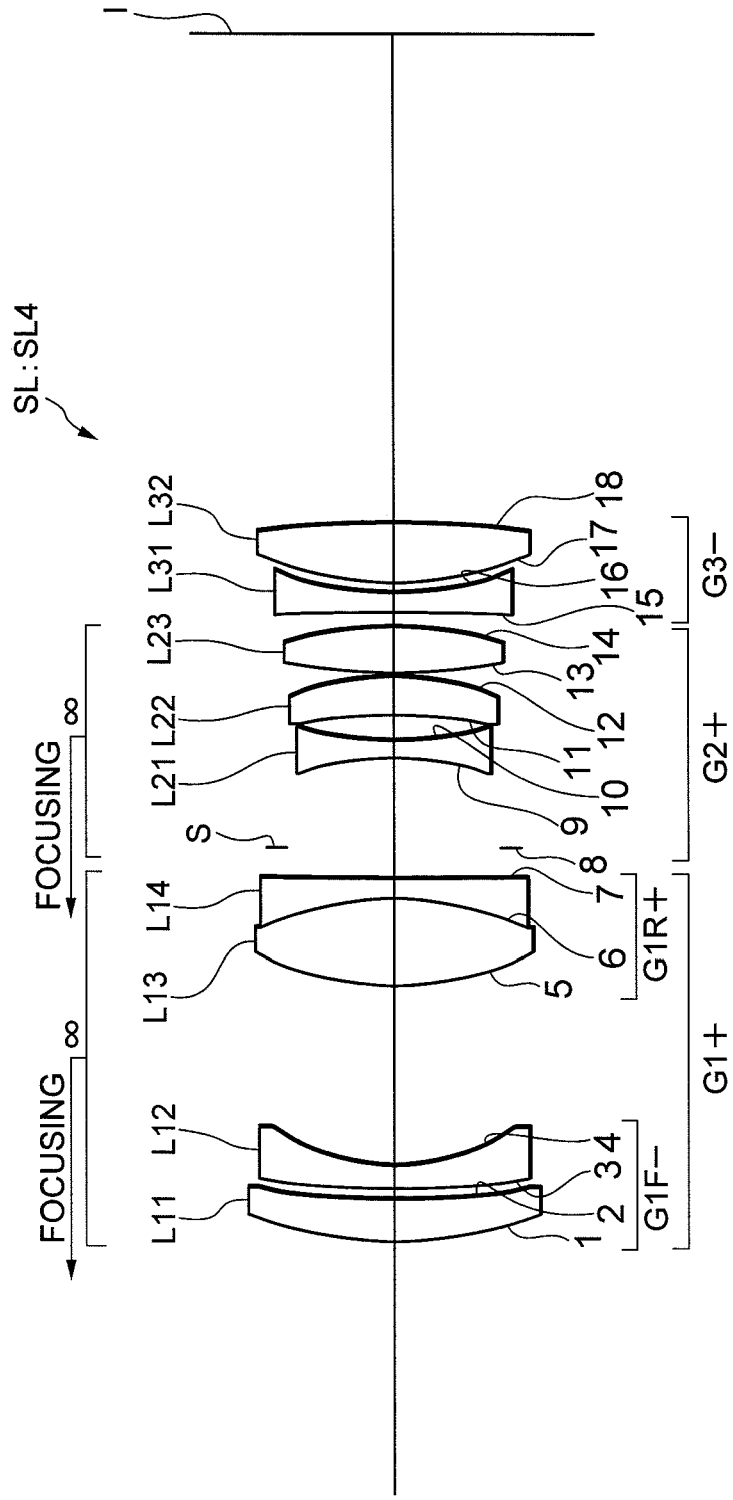
FIG. 8 is a sectional view showing a lens configuration of an imaging lens according to Example 4 of the present application.

FIG. 8 is a sectional view showing a lens configuration of an imaging lens SL4 according to Example 4 of the present application. The imaging lens SL4 according to Example 4 is composed of, in order from an object side, a first lens group G1 having positive refractive power, an aperture stop S, a second lens group G2 having positive refractive power, and a third lens group G3 having negative refractive power. Upon focusing from an infinity object to a close object, the first lens group G1 and the second lens group G2 (focusing lens group) are moved independently toward the object side along the optical axis, thereby focusing on an object disposed at a finite distance.

The first lens group G1 is composed of, in order from the object side, a front group G1F having negative refractive power, and a rear group G1R having positive refractive power. The front group G1F is composed of, in order from the object side, a positive meniscus lens L11 having a convex surface facing the object side and having a smaller absolute value of a radius of curvature of the object side surface than that of the image side surface, and a negative meniscus lens L12 having a concave surface facing the image side and having a smaller absolute value of a radius of curvature of the image side surface than that of the object side surface. With constructing the front group G1F in this manner, it becomes possible to excellently correct coma and distortion with securing negative refractive power. The rear group G1R is composed of a cemented lens constructed by, in order from the object side, a double convex positive lens L13 cemented with a negative meniscus lens L14 having a concave surface facing the object side and a smaller absolute value of a radius of curvature of the object side surface than that of the image side surface. With constructing the rear group G1R in this manner, it becomes possible to correct spherical aberration and longitudinal chromatic aberration with securing strong positive refractive power.

The second lens group G2 is composed of, in order from the object side, an aperture stop S, a double concave negative lens L21, a positive meniscus lens L22 having a convex surface facing the image side, and a double convex positive lens L23. Since the first lens group G1 has positive refractive power, light rays come out from the object are incident on the second lens group G2 as converging light rays, so that with disposing the double concave negative lens L21 to the object side of the second lens group G2, the light rays are temporarily diverged. Then, with disposing the positive meniscus lens L22 and the double convex positive lens L23 to the image side of the negative lens L21, spherical aberration and coma are excellently corrected.

The third lens group G3 is composed of, in order from the object side, a double concave negative lens L31 having a smaller absolute value of a radius of curvature of the image side surface than that of the object side surface, and a double convex positive lens L32, thereby securing a sufficient back focal length and correcting curvature of field.

Various values associated with the imaging lens SL4 according to Example 4 are listed in Table 4.

TABLE 4

(Specifications)

FNO = 2.830
f = 50
ω = 16.591
Y = 15.00
Bf = 38.500
TL = 95.504

[Lens Data]

| i | r | d | nd | vd |
|---|---|---|---|---|
| 1 | 34.0919 | 3.4 | 1.805181 | 25.42 |
| 2 | 78.2611 | 0.8 | | |
| 3 | 84.8565 | 1.9 | 1.698947 | 30.13 |
| 4 | 18.1430 | 14.2 | | |
| 5 | 25.7196 | 7.0 | 1.743997 | 44.79 |
| 6 | −26.0123 | 1.5 | 1.581439 | 40.75 |
| 7 | −1407.4300 | (d7) | | |
| 8 | ∞ | 7.2 | Aperture Stop S | |
| 9 | −22.7294 | 1.4 | 1.728250 | 28.46 |
| 10 | 31.5074 | 2.0 | | |
| 11 | −38.9885 | 3.1 | 1.620411 | 60.29 |

TABLE 4-continued

| 12 | −22.7280 | 0.2 | | |
| 13 | 47.0519 | 3.7 | 1.693495 | 50.81 |
| 14 | −33.1230 | (d14) | | |
| 15 | −190.2480 | 1.6 | 1.743997 | 44.79 |
| 16 | 26.9892 | 0.8 | | |
| 17 | 28.9798 | 4.7 | 1.581439 | 40.75 |
| 18 | −86.9708 | 38.5 | | |

(Variable Distances)

| | INF | MID | CLD |
|---|---|---|---|
| β = | 0 | −0.5 | −1.0 |
| d0 = | ∞ | 102.988 | 53.175 |
| d7 = | 2.404 | 1.728 | 1.419 |
| d14 = | 1.100 | 18.846 | 36.100 |

(Values for Conditional Expressions)

(1) (−f1F)/f1R = 2.50
(2) f1R/f = 0.575
(3) (−f3)/f1 = 6.62
(4) dFR/f = 0.284
(5) (−f1Fn)/f = 0.67
(6) X1/f = 0.680
(7) X2/f = 0.700

Figure 9A:
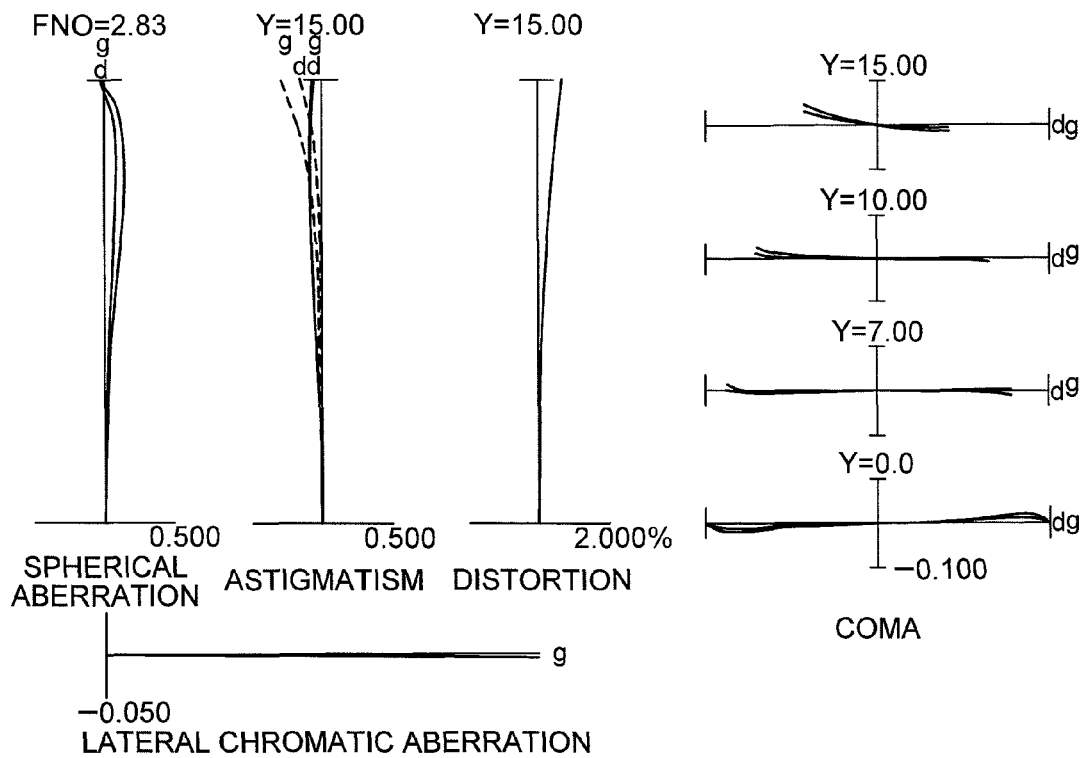
Figure 9B:
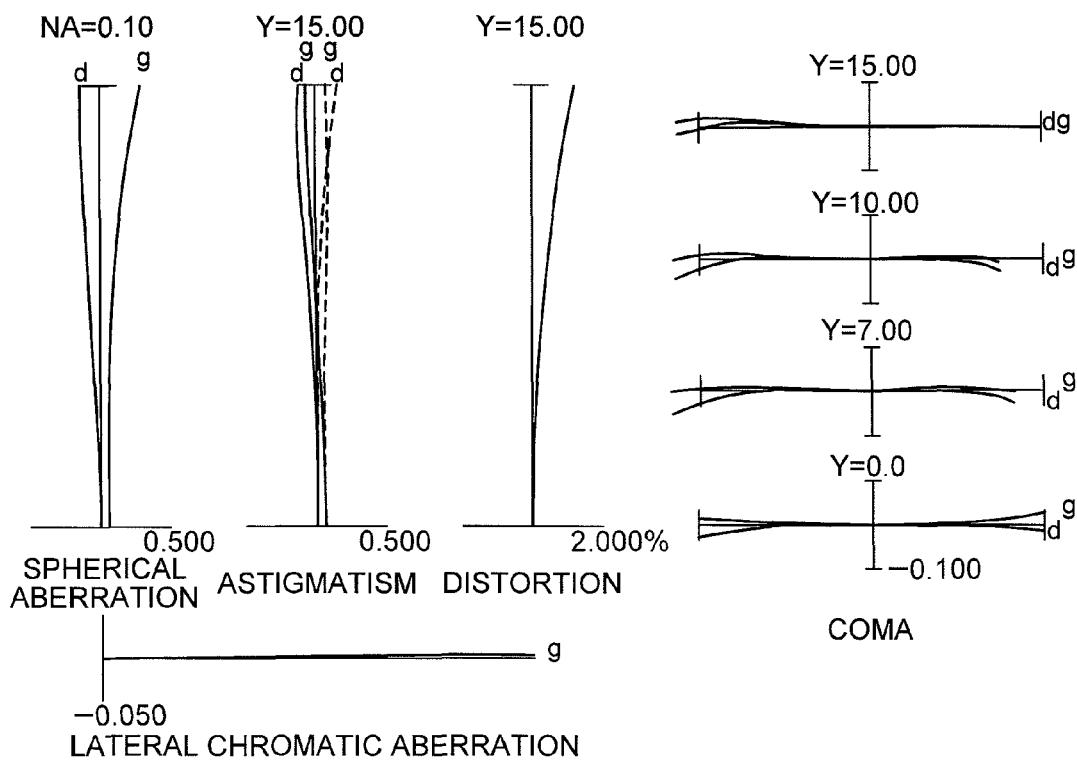

FIGS. 9A and 9B are graphs showing various aberrations of the imaging lens according to Example 4, in which FIG. 9A is upon focusing on infinity and FIG. 9B is upon focusing on a closest shooting distance. As is apparent from various graphs, the imaging lens according to Example 4 shows superb optical performance as a result of good corrections to various aberrations over entire focusing range from infinity to a close object in spite of configuring each lens group with extremely fewer numbers of lenses. Moreover, variation in distortion is small.

Example 5

Figure 10:
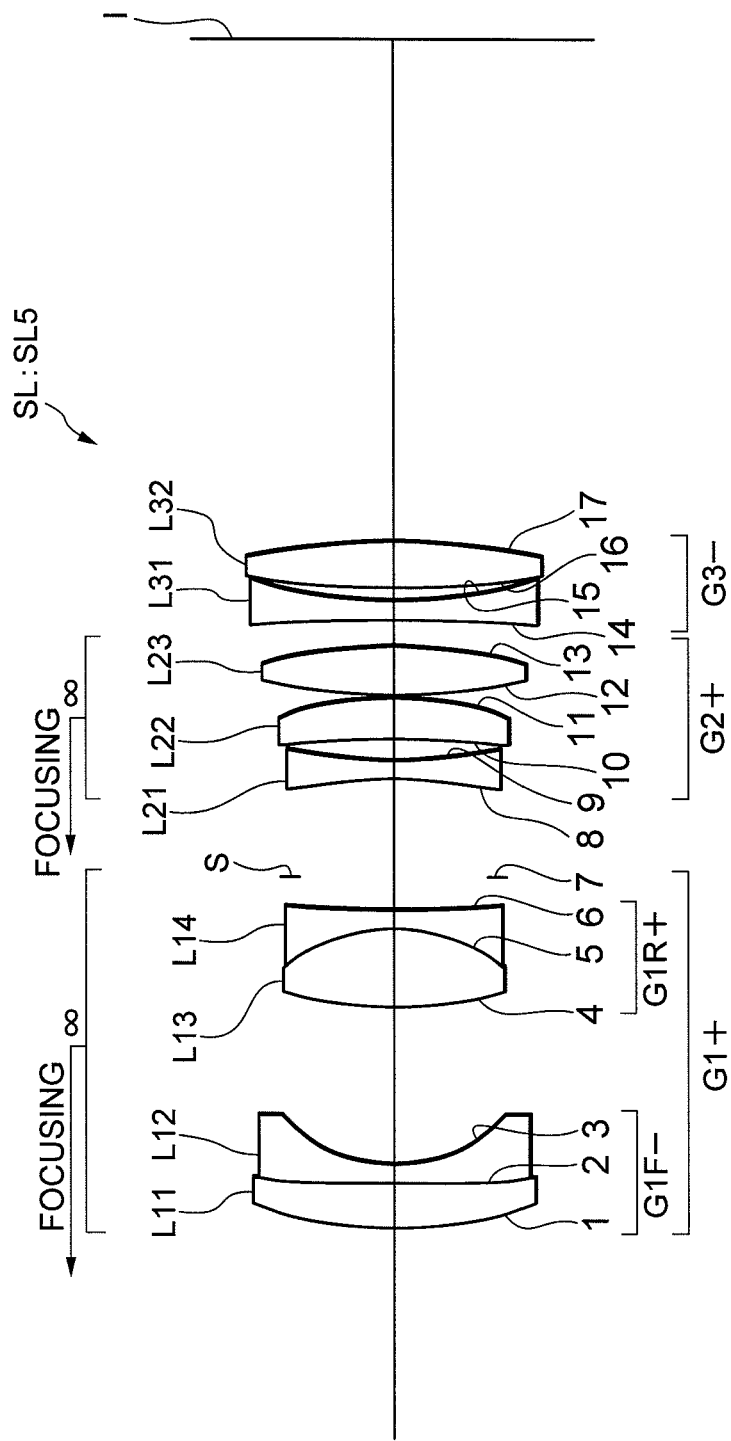
FIG. 10 is a sectional view showing a lens configuration of an imaging lens according to Example 5 of the present application.

FIG. 10 is a sectional view showing a lens configuration of an imaging lens SL5 according to Example 5 of the present application. The imaging lens SL5 according to Example 5 is composed of, in order from an object side, a first lens group G1 having positive refractive power, an aperture stop S, a second lens group G2 having positive refractive power, and a third lens group G3 having negative refractive power. Upon focusing from an infinity object to a close object, the first lens group G1 and the second lens group G2 (focusing lens group) are moved independently toward the object side along the optical axis, thereby focusing on an object disposed at a finite distance.

The first lens group G1 is composed of, in order from the object side, a front group G1F having negative refractive power, and a rear group G1R having positive refractive power. The front group G1F is composed of a cemented lens constructed by, in order from the object side, a positive meniscus lens L11 having a convex surface facing the object side cemented with a negative meniscus lens L12 having a concave surface facing the image side. Incidentally, the cemented lens may be constructed by a double convex positive lens cemented with a double concave negative lens. With constructing the negative meniscus lens L12 having a smaller absolute value of radius of curvature of the image side surface than that of the object side surface, it becomes possible to correct coma and distortion from infinity to a close object. The rear group G1R is composed of a cemented lens constructed by, in order from the object side, a double convex positive lens L13 cemented with a double concave negative lens L14. With disposing the front group G1F having negative refractive power to the object side of the first lens group G1 in this manner, it becomes possible to make longer the distance between the object and the positive meniscus lens L11 upon focusing by moving the first lens group G1 to the object side.

The second lens group G2 is composed of three lenses that are, in order from the object side, a double concave negative lens L21, a positive meniscus lens L22 having a convex surface facing the image side, and a double convex positive lens L23. Since the first lens group G1 has positive refractive power, light rays come out from the object are incident on the second lens group G2 as converging light rays, so that with disposing the double concave negative lens L21 to the object side of the second lens group G2, the light rays are temporarily diverged. Then, with disposing the positive meniscus lens L22 and the double convex positive lens L23 to the image side of the negative lens L21, spherical aberration and coma are excellently corrected.

The third lens group G3 is composed of, in order from the object side, a double concave negative lens L31, and a double convex positive lens L32, thereby securing a sufficient back focal length and correcting curvature of field. The third lens group G3 may be a positive lens and a negative lens in this order.

Although the aperture stop S is disposed between the rear group G1R of the first lens group G1 and the second lens group G2, the aperture stop S may be disposed between the front group G1F and the rear group G1R in the first lens group G1. Alternatively, the aperture stop S may be disposed in the second lens group G2.

In Example 5, an aspherical surface is introduced in each lens group, thereby increasing optical performance. Specifically, with making the image side surface of the negative meniscus lens L12 an aspherical surface, it becomes possible to suppress variation in distortion upon focusing from infinity to a closest shooting range (β=−1.0). Moreover, with making the image side surface of the double convex positive lens L23 an aspherical surface, it becomes possible to suppress variation in coma upon focusing from infinity to the closest shooting range (β−1.0). Furthermore, with making the image side surface of the double concave negative lens L31 an aspherical surface, it becomes possible to correct curvature of field.

Various values associated with the imaging lens SL5 according to Example 5 are listed in Table 5. In (Aspherical Surface Data), an aspherical surface is expressed by the following expression (a):

$$S(y) = (y^2/r)/\left[1 + [1 - \kappa(y^2/r^2)]^{1/2}\right] + A4 \times y^4 + A6 \times y^6 + A8 \times y^8 + A10 \times y^{10} \quad (a)$$

where "y" denotes a vertical height from the optical axis, S(y) denotes a sag amount which is a distance along the optical axis from the tangent surface at the vertex of the aspherical surface to the aspherical surface at the vertical height y from the optical axis, r denotes a radius of curvature of a reference sphere (paraxial radius of curvature), κ denotes a conical coefficient, and An denotes an aspherical coefficient of n-th order. In [Aspherical Surface Data], "E-n" denotes "×10$^{-n}$". In Example 5, an aspherical coefficient of a second order A2 is 0. Each aspherical surface in Example 5 is expressed in [Lens Data] by attaching "*" to the left side of the surface number.

TABLE 5

(Specifications)

FNO = 2.870
f = 40
ω = 20.504
Y = 15.00
Bf = 39.819
TL = 94.159

(Lens Data)

| i | r | d | nd | νd |
|---|---|---|---|---|
| 1 | 39.0832 | 3.5 | 1.882997 | 40.76 |
| 2 | 289.4752 | 1.5 | 1.516330 | 64.14 |
| *3 | 13.0001 | 12.5 | | |
| 4 | 39.0426 | 6.1 | 1.699998 | 48.08 |
| 5 | −14.3688 | 1.5 | 1.581439 | 40.75 |
| 6 | 193.6469 | 2.5 | | |
| 7 | ∞ | (d7) | Aperture Stop S | |
| 8 | −36.6799 | 1.4 | 1.755199 | 27.51 |
| 9 | 46.3094 | 1.7 | | |
| 10 | −75.9583 | 3.3 | 1.729157 | 54.68 |
| 11 | −28.3466 | 0.24 | | |
| 12 | 54.4214 | 3.9 | 1.729157 | 54.68 |
| *13 | −36.7891 | (d13) | | |
| 14 | −134.9520 | 1.6 | 1.804000 | 46.57 |
| *15 | 44.8591 | 1.0 | | |
| 16 | 95.5721 | 3.6 | 1.720000 | 41.98 |
| 17 | −56.128 | 39.8 | | |

(Aspherical Surface Data)

Surface Number: 3

κ = 1.0000
A4 = 0.00000E+00
A6 = −4.37302E−09
A8 = 0.00000E+00
A10 = 0.00000E+00

Surface Number: 13

κ = 1.1778
A4 = 0.00000E+00
A6 = 0.00000E+00
A8 = 0.00000E+00
A10 = 0.00000E+00

Surface Number: 15

κ = 0.7665
A4 = 0.00000E+00
A6 = 0.00000E+00
A8 = 0.00000E+00
A10 = 0.00000E+00

(Variable Distances)

| | INF | MID | CLD |
|---|---|---|---|
| β = | 0 | −0.5 | −1.0 |
| d0 = | ∞ | 77.055 | 36.881 |
| d7 = | 8.000 | 7.925 | 8.799 |
| d13 = | 2.000 | 16.714 | 31.500 |

(Values for Conditional Expressions)

(1) (−f1F)/f1R = 1.44
(2) f1R/f = 1.091
(3) (−f3)/f1 = 4.03
(4) dFR/f = 0.313
(5) (−f1Fn)/f = 0.66
(6) X1/f = 0.757
(7) X2/f = 0.737

FIGS. 11A and 11B are graphs showing various aberrations of the imaging lens according to Example 5, in which FIG. 11A is upon focusing on infinity and FIG. 11B is upon focusing on a closest shooting distance.

As is apparent from various graphs, the imaging lens according to Example 5 shows superb optical performance as a result of good corrections to various aberrations over entire focusing range from infinity to a close object in spite of configuring each lens group with extremely fewer numbers of lenses. Moreover, variation in distortion is small.

Figure 14:
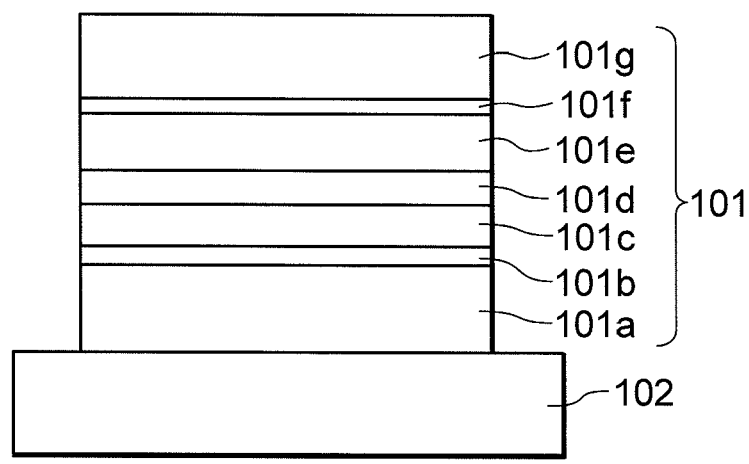
FIG. 14 is an explanatory view showing a configuration of an antireflection coating according to the present embodiment.

Then, an antireflection coating (which is also referred to as a multi-layered broadband antireflection coating) used for the imaging lenses SL1 through SL5 (which are generically termed the imaging lens SL) according to the present embodiment, will be described. FIG. 14 is an explanatory view showing a configuration of an antireflection coating according to the present embodiment. This antireflection coating 101 is a 7-layered film formed on an optical surface of an optical member 102 such as a lens. A first layer 101a is composed of aluminum oxide that is vapor-deposited by a vacuum evaporation method. A second layer 101b composed of a mixture of titanium oxide and zirconium oxide that are vapor-deposited by the vacuum evaporation method, is further formed on the first layer 101a. Moreover, a third layer 101c composed of the aluminum oxide that is vapor-deposited by the vacuum evaporation method is formed on the second layer 101b, and a fourth layer 101d composed of the mixture of titanium oxide and zirconium oxide that are vapor-deposited by the vacuum evaporation method, is further formed on the third layer 101c. Still further, a fifth layer 101e composed of aluminum oxide that is vapor-deposited by the vacuum evaporation method is formed on the fourth layer 101d, and a sixth layer 101f composed of the mixture of titanium oxide and zirconium oxide that are vapor-deposited by the vacuum evaporation method, is further formed on the fifth layer 101e.

Then, a seventh layer 101g composed of a mixture of magnesium fluoride and silica is formed by a wet process on the sixth layer 101f, thus forming the antireflection coating 101 according to the present embodiment. The formation of the seventh layer 101g involves using a sol-gel process classified as one type of the wet process. The sol-gel process is a process of transforming a sol acquired by mixing a material into a gel having no fluidity through hydrolyzing condensation polymerization reaction and acquiring a product by heat-decomposing this gel. In manufacturing an optical thin film, the film may be generated by coating a material sol of the optical thin film over the optical surface of the optical member and dry-solidifying the sol into a gel film. Note that the wet process may involve using, without being limited to the sol-gel process, a process of acquiring a solid-state film through none of the gel state.

Thus, the first layer 101a through the sixth layer 101f of the antireflection coating 101 are formed by electron beam evaporation defined as a dry process, and the uppermost seventh layer 101g is formed in the following procedures by the wet process using a sol liquid prepared by a hydrogen fluoride/acetic acid magnesium process. To begin with, an aluminum oxide layer serving as the first layer 101a, a titanium oxide-zirconium oxide mixture layer serving as the second layer 101b, an aluminum oxide layer serving as the third layer 101c, a titanium oxide-zirconium oxide mixture layer serving as the fourth layer 101d, an aluminum oxide layer serving as the fifth layer 101e and a titanium oxide-zirconium oxide mixture layer serving as the sixth layer 101f, are formed in advance in this order on a film growth surface (the optical surface of the optical member 102 described above) by using a vacuum evaporation apparatus. Then, after taking the optical member 102 out of the evaporation apparatus, the layer composed of the mixture of magnesium fluoride and silica is formed as the seventh layer 101g by coating silicon alkoxide-added sol liquid prepared by the hydrogen fluoride/acetic acid magnesium process in a way that uses a spin coating method. The formula (b) given below is a reaction formula on the occasion of being prepared by the hydrogen fluoride/acetic acid magnesium process:

$$2HF+Mg(CH3COO)2 \rightarrow MgF2+2CH3COOH \quad (b).$$

The sol liquid used for this film growth, after mixing the materials and after conducting a high-temperature pressurization maturing process at 140° C. for 24 hours in an autoclave, is used for growing the film. The optical member 102, after finishing the film growth of the seventh layer 101g, undergoes a heating process at 160° for one hour in the atmospheric air and is thus completed. With the use of the sol-gel process, particles on the order of several nanometers (nm) to several dozens nanometers (nm) in particle size are deposited while the air gaps remain, thereby forming the seventh layer 101g.

Optical performance of the optical member including the thus-formed antireflection coating 101 will hereinafter be described by using spectral characteristics shown in FIG. 15.

The optical member (lens) including the antireflection coating according to the present embodiment is formed under the conditions shown in the following Table 6. Herein, the Table 6 shows respective optical film thicknesses of the layers 101a (the first layer) through 101g (the seventh layer) of the antireflection coating 101, which are obtained under such conditions that λ denotes a reference wavelength and the refractive index of the substrate (optical member) is set to 1.62, 1.74 and 1.85. Note that the Table 6 shows Al2O3 expressed as the aluminum oxide, ZrO2+TiO2 expressed as the mixture of titanium oxide and zirconium oxide and MgF2+SiO2 expressed as the mixture of magnesium fluoride and silica.

Figure 15:
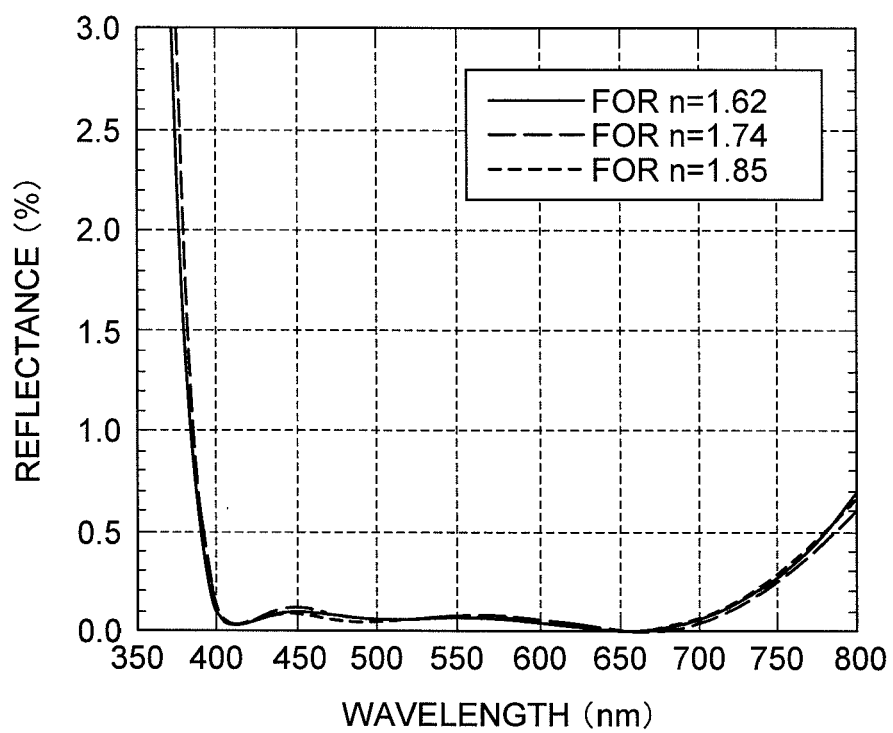
FIG. 15 is a graph showing spectral reflectance of an anti reflection coating according to the present embodiment.

FIG. 15 shows the spectral characteristics when the light beams vertically get incident on the optical member in which the optical film thickness of each of the layers of the antireflection coating 101 is designed, with the reference wavelength λ set to 550 nm in the Table 6.

It is understood from FIG. 15 that the optical member including the antireflection coating 101 designed with the reference wavelength λ set to 550 nm can restrain the reflectance down to 0.2% or under over the entire range in which the wavelengths of the light beams are 420 nm through 720 nm. Further, in the Table 6, even the optical member including the antireflection coating 101, in which each optical film thickness is designed with the reference wavelength λ set to the d-line (wavelength 587.6 nm), has substantially the same spectral characteristics as in the case where the reference wavelength λ shown in FIG. 15 is 550 nm in a way that affects substantially none of the spectral characteristics thereof.

TABLE 6

| layer | material | n | thicknesses of layers | | |
|---|---|---|---|---|---|
| | medium air | 1 | | | |
| 7 | MgF2 + SiO2 | 1.26 | 0.268λ | 0.271λ | 0.269λ |
| 6 | ZrO2 + TiO2 | 2.12 | 0.057λ | 0.054λ | 0.059λ |
| 5 | Al2O3 | 1.65 | 0.171λ | 0.178λ | 0.162λ |
| 4 | ZrO2 + TiO2 | 2.12 | 0.127λ | 0.13λ | 0.158λ |
| 3 | Al2O3 | 1.65 | 0.122λ | 0.107λ | 0.08λ |
| 2 | ZrO2 + TiO2 | 2.12 | 0.059λ | 0.075λ | 0.105λ |
| 1 | Al2O3 | 1.65 | 0.257λ | 0.03λ | 0.03λ |
| | n (substrate) | | 1.62 | 1.74 | 1.85 |

Next, a modified example of the antireflection coating will be explained. The antireflection coating is a 5-layered film, and, similarly to the Table 6, the optical film thickness of each layer with respect to the reference wavelength λ is designed under conditions shown in the following Table 7. In this modified example, the formation of the fifth layer involves using the sol-gel process described above.

Figure 16:
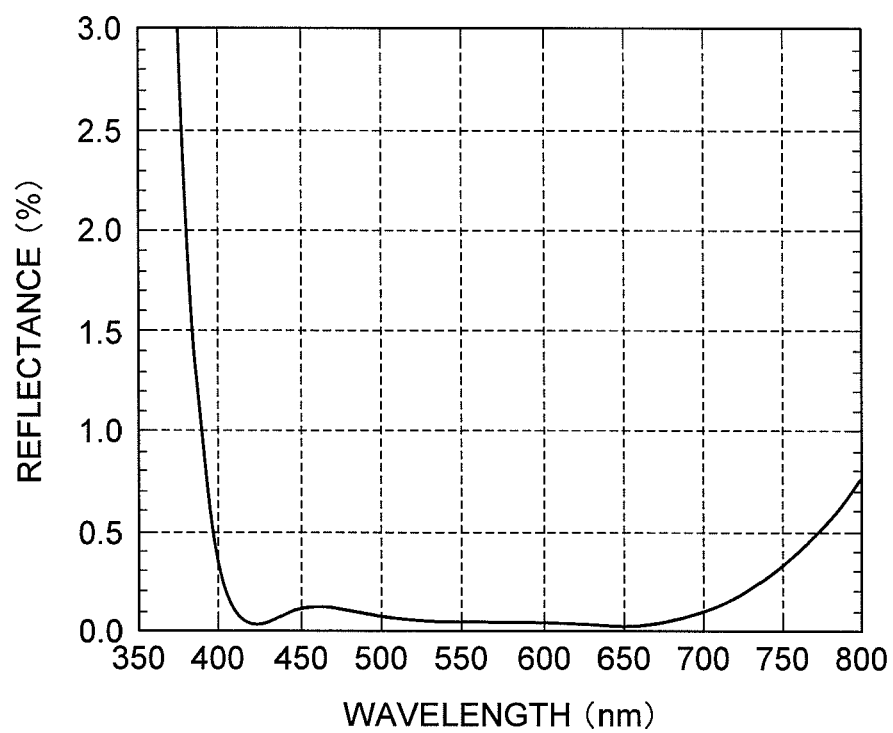
FIG. 16 is a graph showing spectral reflectance of an anti reflection coating according to a variation.

FIG. 16 shows the spectral characteristics when the light beams vertically get incident on the optical member in which the optical film thickness of each of the layers is designed, with the substrate refractive index set to 1.52 and the reference wavelength λ set to 550 nm in the Table 7. It is understood from FIG. 16 that the antireflection coating in the modified example can restrain the reflectance down to 0.2% or under over the entire range in which the wavelengths of the light beams are 420 nm-720 nm. Note that in the Table 7, even the optical member including the antireflection coating, in which each optical film thickness is designed with the reference wavelength λ set to the d-line (wavelength 587.6 nm), has substantially the same spectral characteristics as the spectral characteristics shown in FIG. 15 in a way that affects substantially none of the spectral characteristics thereof.

Figure 17:
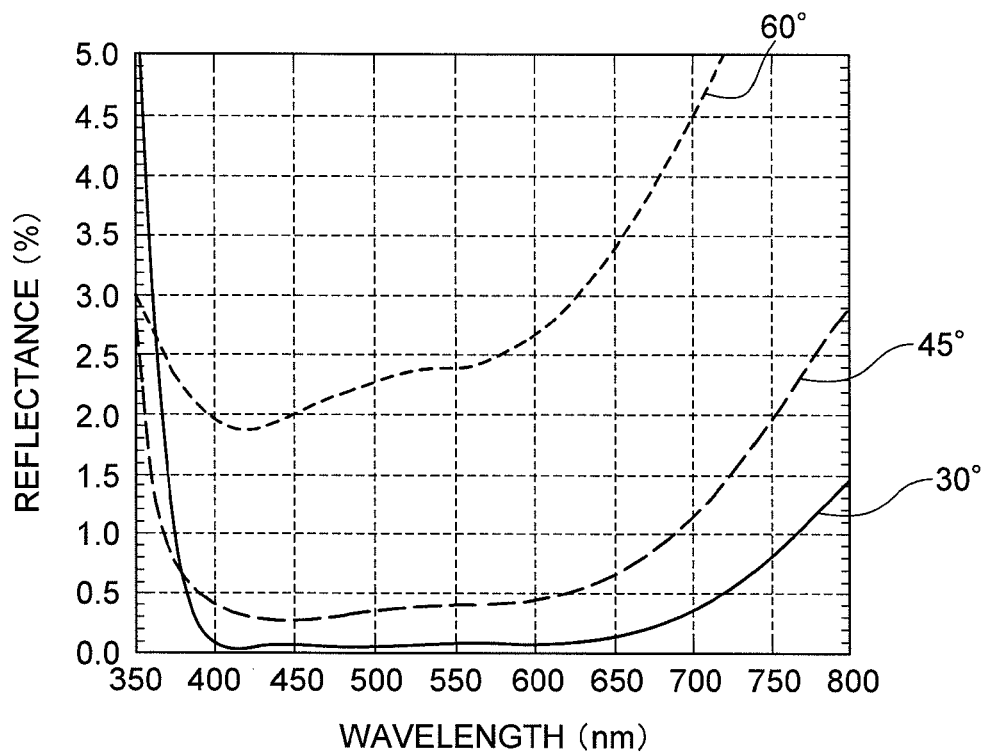
FIG. 17 is a graph showing angular dependence of spectral reflectance of an anti reflection coating according to a variation.

FIG. 17 shows the spectral characteristics in such a case that the incident angles of the light beams upon the optical member having the spectral characteristics shown in FIG. 16 are 30 degrees, 45 degrees and 60 degrees, respectively. Note that FIGS. 16 and 17 do not illustrate the spectral characteristics of the optical member including the antireflection coating in which the substrate refractive index is 1.46 shown in Table 7; however, it is understood that the optical member has substantially the same spectral characteristics such as the substrate refractive index being 1.52.

TABLE 7

| layer | material | n | thicknesses of layers | |
|---|---|---|---|---|
| | medium air | 1 | | |
| 5 | MgF2 + SiO2 | 1.26 | 0.275λ | 0.269λ |
| 4 | ZrO2 + TiO2 | 2.12 | 0.045λ | 0.043λ |
| 3 | Al2O3 | 1.65 | 0.212λ | 0.217λ |
| 2 | ZrO2 + TiO2 | 2.12 | 0.077λ | 0.066λ |
| 1 | Al2O3 | 1.65 | 0.288λ | 0.290λ |
| | n (substrate) | | 1.46 | 1.52 |

Figure 18:
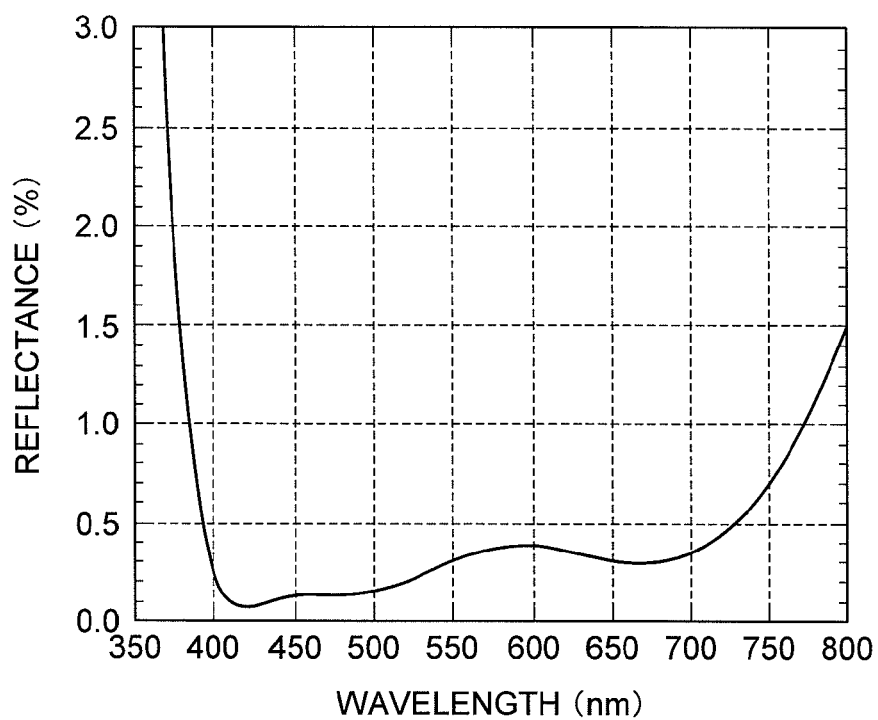
FIG. 18 is a graph showing spectral reflectance of an anti reflection coating according to a conventional example.

Furthermore, FIG. 18 shows one example of the antireflection coating grown by only the dry process such as the conventional vacuum evaporation method by way of a comparison. FIG. 18 shows the spectral characteristics when the light beams get incident on the optical member in which to design the antireflection coating structured under the conditions shown in the following Table 8, with the substrate refractive index set to 1.52 in the same way as in the Table 7. Moreover, FIG. 19 shows the spectral characteristics in such a case that the incident angles of the light beams upon the optical member having the spectral characteristics shown in FIG. 18 are 30 degrees, 45 degrees and 60 degrees, respectively.

TABLE 8

| layer | material | n | thicknesses of layers |
|---|---|---|---|
| | medium air | 1 | |
| 7 | MgF2 | 1.39 | 0.243λ |
| 6 | ZrO2 + TiO2 | 2.12 | 0.119λ |
| 5 | Al2O3 | 1.65 | 0.057λ |
| 4 | ZrO2 + TiO2 | 2.12 | 0.220λ |
| 3 | Al2O3 | 1.65 | 0.064λ |
| 2 | ZrO2 + TiO2 | 2.12 | 0.057λ |
| 1 | Al2O3 | 1.65 | 0.193λ |
| | refractive index of substrate | | 1.52 |

Figure 19:
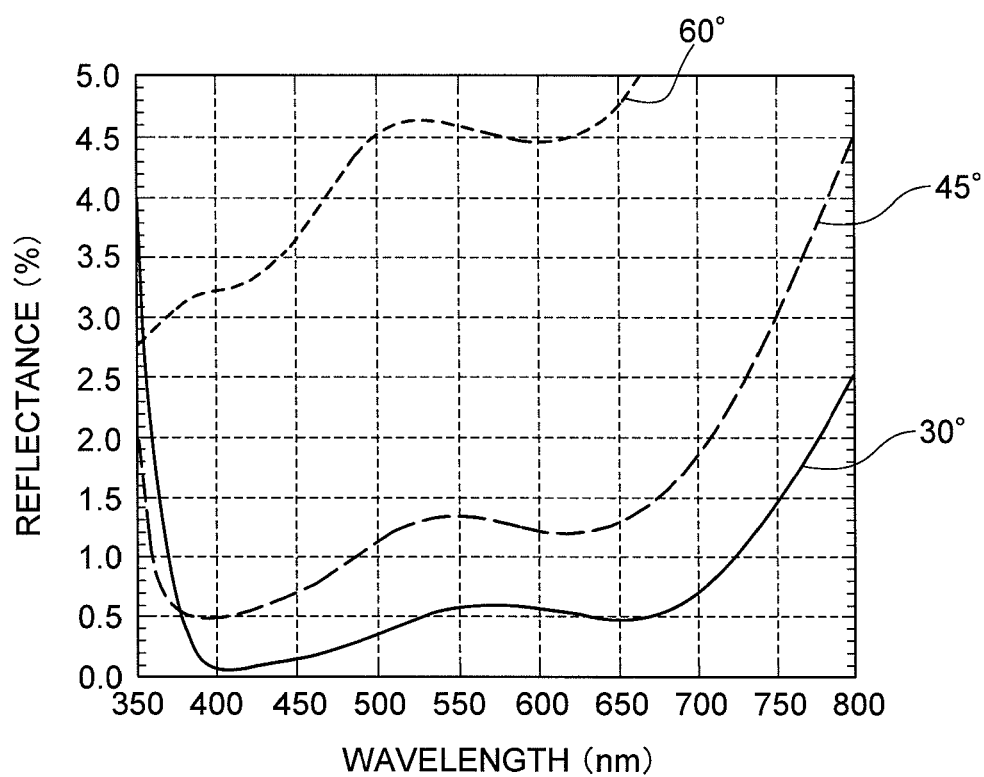
FIG. 19 is a graph showing angular dependence of spectral reflectance of an anti reflection coating according to a conventional example.

To compare the spectral characteristics of the optical member including the antireflection coating according to the present embodiment illustrated in FIGS. 15 through 17 with the spectral characteristics in the conventional examples shown in FIGS. 18 and 19, it is well understood that the present antireflection coating has the much lower reflectance at any incident angles and, besides, has the low reflectance in the broader band.

Explained next is an example of applying the antireflection coating shown in the Tables 6 and 7 to Examples 1 through 5 discussed above.

In the imaging lens SL1 according to Example 1, as shown in the Table 1, the refractive index nd of the positive meniscus lens L22 of the second lens group G2 is 1.651597 (nd=1.651597), and the refractive index nd of the negative meniscus lens L31 of the third lens group G3 is 1.772499 (nd=1.772499), whereby it is feasible to reduce the reflected light from each lens surface and to reduce ghost images and flare as well by applying the antireflection coating 101 (see Table 6) corresponding to 1.62 as the substrate refractive index to the image side lens surface of the positive meniscus lens L22 and applying the antireflection coating 101 (see Table 6) corresponding to 1.74 as the substrate refractive index to the object side lens surface of the negative meniscus lens L31.

In the imaging lens SL2 according to Example 2, as shown in the Table 2, the refractive index nd of the double concave negative lens L31 of the third lens group G3 is 1.772499 (nd=1.772499), and the refractive index nd of the double convex positive lens L32 of the third lens group G3 is 1.548141 (nd=1.548141), whereby it is feasible to reduce the reflected light from each lens surface and to reduce ghost images and flare as well by applying the antireflection coating 101 (see Table 6) corresponding to 1.74 as the substrate refractive index to the image side lens surface of the double concave negative lens L31 and applying the antireflection coating 101 (see Table 7) corresponding to 1.52 as the substrate refractive index to the object side lens surface of the double convex positive lens L32.

In the imaging lens SL3 according to Example 3, as shown in the Table 3, the refractive index nd of the positive meniscus lens L22 of the second lens group G2 is 1.651597 (nd=1.651597), and the refractive index nd of the negative meniscus lens L31 of the third lens group G3 is 1.772499 (nd=1.772499), whereby it is feasible to reduce the reflected light from each lens surface and to reduce ghost images and flare as well by applying the antireflection coating 101 (see Table 6) corresponding to 1.62 as the substrate refractive index to the image side lens surface of the positive meniscus lens L22 and applying the antireflection coating 101 (see Table 6) corresponding to 1.74 as the substrate refractive index to the object side lens surface of the negative meniscus lens L31.

In the imaging lens SL4 according to Example 4, as shown in the Table 4, the refractive index nd of the positive meniscus lens L11 of the first lens group G1 is 1.805181 (nd=1.805181), and the refractive index nd of the double convex positive lens L13 of the first lens group G1 is 1.743997 (nd=1.743997), whereby it is feasible to reduce the reflected light from each lens surface and to reduce ghost images and flare as well by applying the antireflection coating 101 (see Table 6) corresponding to 1.85 as the substrate refractive index to the image side lens surface of the positive meniscus lens L11 and applying the antireflection coating 101 (see Table 6) corresponding to 1.74 as the substrate refractive index to the object side lens surface of the double convex positive lens L13.

In the imaging lens SL5 according to Example 5, as shown in the Table 5, the refractive index nd of the positive meniscus lens L11 of the first lens group G1 is 1.882997 (nd=1.882997), and the refractive index nd of the double convex positive lens L13 of the first lens group G1 is 1.699998 (nd=1.699998), whereby it is feasible to reduce the reflected light from each lens surface and to reduce ghost images and flare as well by applying the antireflection coating 101 (see Table 6) corresponding to 1.85 as the substrate refractive index to the object side lens surface of the positive meniscus lens L11 and applying the antireflection coating 101 (see Table 6) corresponding to 1.74 as the substrate refractive index to the object side lens surface of the double convex positive lens L13.

Incidentally, the following description may suitably be applied within limits that do not deteriorate optical performance.

In the explanation described above and Examples shown below, although a three-lens-group configuration is shown, the lens-group configuration according to the present application is not limited to this, other lens-group configurations such as a four-lens-group configuration or a five-lens-group configuration is possible. Moreover, a lens configuration that a lens or a lens group is added to the most object side thereof is possible, and a lens configuration that a lens or a lens group is added to the most image side thereof is also possible. Incidentally, a lens group means a portion that includes at least one lens and is separated by air spaces that vary upon focusing.

In order to vary focusing from infinity to a close object, a portion of a lens group, a single lens group, or a plurality of lens groups may be moved along the optical axis as a focusing lens group. In this case, the focusing lens group can be used for auto focus, and suitable for being driven by a motor such as an ultrasonic motor. It is particularly preferable that the first lens group G1 and the second lens group G2 are moved as the focusing lens group.

A lens group or a portion of a lens group may be shifted in a direction including a component perpendicular to the optical axis as a vibration reduction lens group, or tilted (swayed) in a direction including the optical axis for correcting an image blur caused by a camera shake. It is particularly preferable that at least a portion of the third lens group G3 is used as a vibration reduction lens group.

A lens surface of a lens may be a spherical surface, a plane surface, or an aspherical surface. When a lens surface is a spherical surface or a plane surface, lens processing, assembling and adjustment become easy, and deterioration in optical performance caused by lens processing, assembling and adjustment errors can be prevented, so that it is preferable. Moreover, even if the image plane is shifted, deterioration in optical performance is little, so that it is preferable. When a lens surface is an aspherical surface, the aspherical surface may be fabricated by a fine grinding process, a glass molding process that a glass material is formed into an aspherical shape by a mold, or a compound type process that a resin material is formed into an aspherical shape on a glass lens surface. A lens surface may be a diffractive optical surface, and a lens may be a graded-index type lens (GRIN lens) or a plastic lens.

Although an aperture stop S is preferably provided to the image side of the rear group G1R, the aperture stop S may be disposed between the front group G1F and the rear group G1R. Alternatively, the aperture stop S may be disposed in the second lens group G2. Moreover, the function may be substituted by a lens frame without disposing a member as an aperture stop.

In an imaging lens SL according to the present application, the first lens group G1 preferably includes one positive lens component and one negative lens component. In an imaging lens SL according to the present application, the second lens group G2 preferably includes two positive lens components and one negative lens component. The second lens group G2 preferably disposes these lens components, in order from the object side, negative-positive-positive with an air space between each of them. In an imaging lens SL according to the present application, the third lens group G3 preferably includes one positive lens component and one negative lens component.

Above-described each example only shows a specific example for the purpose of better understanding of the present invention. Accordingly, it is needless to say that the invention in its broader aspect is not limited to the specific details and representative devices shown and described herein. Incidentally, the same effect of the present application can be obtained with proportionally increasing or decreasing the lens data.

The present invention makes it possible to provide an imaging lens capable of obtaining excellent optical performance from infinity to a close object with downsizing the optical system with reducing ghost images and flare, an optical apparatus equipped therewith, and a method for manufacturing the imaging lens.

What is claimed is:

1. An imaging lens comprising, in order from an object side:
   a first lens group having positive refractive power;
   an aperture stop;
   a second lens group having positive refractive power; and
   a third lens group having negative refractive power;
   upon focusing from infinity to a close object, the first lens group and the second lens group moving independently along an optical axis of the imaging lens toward the object side,
   the first lens group including, in order from the object side, a front group having negative refractive power, and a rear group having positive refractive power,
   the front group consisting of, in order from the object side, a positive lens and a negative lens, and
   the following conditional expression being satisfied:

$4.00 < (-f3)/f1 < 10.00$ where f1 denotes a focal length of the first lens group, and f3 denotes a focal length of the third lens group.

2. The imaging lens according to claim 1, wherein an antireflection coating is applied on at least one optical surface among the first lens group through the third lens group, and the antireflection coating includes at least one layer formed by a wet process.

3. The imaging lens according to claim 2, wherein the antireflection coating is a multilayer film, and a layer formed by the wet process is the outermost layer among the layers composing the multilayer film.

4. The imaging lens according to claim 2, wherein when a refractive index at d-line of the layer formed by the wet process is denoted by nd, the refractive index nd is 1.30 or lower.

5. The imaging lens according to claim 2, wherein an optical surface on which the antireflection coating is formed is at least one optical surface among the first lens group and the second lens group, and the optical surface is a concave surface seen from the aperture stop.

6. The imaging lens according to claim 5, wherein the concave surface is a surface facing an image planes side.

7. The imaging lens according to claim 5, wherein the concave surface is a surface facing the object side.

8. The imaging lens according to claim 2, wherein an optical surface on which the antireflection coating is formed is at least one optical surface in the third lens group, and the optical surface is a concave surface seen from an image plane.

9. The imaging lens according to claim 8, wherein the concave surface is a lens surface facing the image side.

10. The imaging lens according to claim 8, wherein the concave surface is a lens surface facing the object side.

11. The imaging lens according to claim 1, wherein the following conditional expression is satisfied:

$1.38 < (-f1F)/f1R < 3.00$ where f1F denotes a focal length of the front group, and f1R denotes a focal length of the rear group.

12. The imaging lens according to claim 1, wherein the following conditional expression is satisfied:

$0.50 < f1R/f < 1.20$ where f1R denotes a focal length of the rear group, and f denotes a focal length of the imaging lens upon focusing on infinity.

13. The imaging lens according to claim 1, wherein a distance between the first lens group and the second lens group varies upon carrying out focusing.

14. The imaging lens according to claim 1, wherein the third lens group is fixed with respect to an image plane upon focusing.

15. The imaging lens according to claim 1, wherein the following conditional expression is satisfied:

$0.20 < dFR/f < 0.33$ where dFR denotes a distance along the optical axis between the most image side lens surface of the front group and the most object side lens surface of the rear group, and f denotes a focal length of the imaging lens upon focusing on infinity.

16. The imaging lens according to claim 1, wherein the following conditional expression is satisfied:

$0.40 < (-f1Fn)/f < 0.90$ where f1Fn denotes a focal length of the negative lens composing the front group in the first lens group, and f denotes a focal length of the imaging lens upon focusing on infinity.

17. The imaging lens according to claim 1, wherein the following conditional expression is satisfied:

$0.60 < X1/f < 0.90$ where X1 denotes an absolute value of a moving amount along the optical axis of the first lens group upon carrying out focusing from infinity to the closest object, and f denotes a focal length of the imaging lens upon focusing on infinity.

18. The imaging lens according to claim 1, wherein the following conditional expression is satisfied:

$0.70 < X2/f < 0.90$ where X2 denotes an absolute value of a moving amount along the optical axis of the second lens group upon carrying out focusing from infinity to the closest object, and f denotes a focal length of the imaging lens upon focusing on infinity.

19. The imaging lens according to claim 1, wherein an aspherical lens is included in at least one of the front group, the rear group and the second lens group.

20. An optical apparatus equipped with the imaging lens according to claim 1.

21. A method for manufacturing an imaging lens including, in order from an object side, a first lens group having positive refractive power, an aperture stop, a second lens group having positive refractive power and a third lens group having negative refractive power, the method comprising steps of:
- disposing the first lens group and the second lens group such that upon focusing from infinity to a close object, the first lens group and the second lens group are moved along an optical axis of the imaging lens independently toward the object side;
- disposing each lens in the first lens group such that the first lens group includes, in order from the object side, a front group having negative refractive power and a rear group having positive refractive power, and the front group consists of, in order from the object side, a positive lens and a negative lens; and
- satisfying the following conditional expression:

$$4.00 < (-f3)/f1 < 10.00$$

where f1 denotes a focal length of the first lens group, and f3 denotes a focal length of the third lens group.

22. The method according to claim 21, further comprising a step of:
- applying an antireflection coating to at least one optical surface among the first lens group through the third lens group such that the antireflection coating includes at least one layer formed by a wet process.

23. The method according to claim 22, further comprising a step of:
- disposing an optical surface on which the antireflection coating is formed in at least one optical surface among the first lens group and the second lens group such that the optical surface has a concave shape seen from the aperture stop.

24. The method according to claim 21, further comprising a step of:
- satisfying the following conditional expression:

$$1.38 < (-f1F)/f1R < 3.00$$

where f1F denotes a focal length of the front group, and f1R denotes a focal length of the rear group.

25. The method according to claim 21, further comprising a step of:
- satisfying the following conditional expression:

$$0.50 < f1R/f < 1.20$$

where f1R denotes a focal length of the rear group, and f denotes a focal length of the imaging lens upon focusing on infinity.

26. An imaging lens comprising, in order from an object side:
- a first lens group having positive refractive power;
- an aperture stop;
- a second lens group having positive refractive power; and
- a third lens group having negative refractive power;
- upon focusing from infinity to a close object, the first lens group and the second lens group moving independently along an optical axis of the imaging lens toward the object side,
- the first lens group including, in order from the object side, a front group having negative refractive power, and a rear group having positive refractive power,
- the front group consisting of, in order from the object side, a positive lens and a negative lens,
- the following conditional expression being satisfied:

$$0.50 < f1R/f < 1.20$$

where f1R denotes a focal length of the rear group, and f denotes a focal length of the imaging lens upon focusing on infinity.

27. A method for manufacturing an imaging lens including, in order from an object side, a first lens group having positive refractive power, an aperture stop, a second lens group having positive refractive power and a third lens group having negative refractive power, the method comprising steps of:
- disposing the first lens group and the second lens group such that upon focusing from infinity to a close object, the first lens group and the second lens group are moved along an optical axis of the imaging lens independently toward the object side;
- disposing each lens in the first lens group such that the first lens group includes, in order from the object side, a front group having negative refractive power and a rear group having positive refractive power, and the front group consists of, in order from the object side, a positive lens and a negative lens; and
- satisfying the following conditional expression:

$$0.50 < f1R/f < 1.20$$

where f1R denotes a focal length of the rear group, and f denotes a focal length of the imaging lens upon focusing on infinity.

28. An imaging lens comprising, in order from an object side:
- a first lens group having positive refractive power;
- an aperture stop;
- a second lens group having positive refractive power; and
- a third lens group having negative refractive power;
- upon focusing from infinity to a close object, the first lens group and the second lens group moving independently along an optical axis of the imaging lens toward the object side,
- the first lens group including, in order from the object side, a front group having negative refractive power, and a rear group having positive refractive power, and
- the front group consisting of, in order from the object side, a positive lens and a negative lens,
- wherein an antireflection coating is applied on at least one optical surface among the first lens group through the third lens group, and the antireflection coating includes at least one layer formed by a wet process; and
- wherein when a refractive index at d-line of the layer formed by the wet process is denoted by nd, the refractive index nd is 1.30 or lower.

29. A method for manufacturing an imaging lens including, in order from an object side, a first lens group having positive refractive power, an aperture stop, a second lens group having positive refractive power and a third lens group having negative refractive power, the method comprising steps of:
- disposing the first lens group and the second lens group such that upon focusing from infinity to a close object, the first lens group and the second lens group are moved along an optical axis of the imaging lens independently toward the object side;
- disposing each lens in the first lens group such that the first lens group includes, in order from the object side, a front group having negative refractive power and a rear group having positive refractive power, and the front group consists of, in order from the object side, a positive lens and a negative lens; and
- applying an antireflection coating to at least one optical surface among the first lens group through the third lens group such that the antireflection coating includes at least one layer formed by a wet process, wherein when a refractive index at d-line of the layer formed by the wet process is denoted by nd, the refractive index nd is 1.30 or lower.

* * * * *